(12) United States Patent
Zhou et al.

(10) Patent No.: US 12,016,095 B2
(45) Date of Patent: *Jun. 18, 2024

(54) SYSTEMS AND METHODS FOR REGULATING LED CURRENTS

(71) Applicant: ON-BRIGHT ELECTRONICS (SHANGHAI) CO., LTD., Shanghai (CN)

(72) Inventors: Jun Zhou, Shanghai (CN); Yunchao Zhang, Shanghai (CN); Lieyi Fang, Shanghai (CN)

(73) Assignee: On-Bright Electronics (Shanghai) Co., Ltd., Shanghai (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/948,757

(22) Filed: Sep. 20, 2022

(65) Prior Publication Data

US 2023/0119958 A1     Apr. 20, 2023

Related U.S. Application Data

(60) Continuation of application No. 17/121,996, filed on Dec. 15, 2020, now Pat. No. 11,483,907, which is a
(Continued)

(30) Foreign Application Priority Data

Dec. 8, 2011   (CN) .......................... 201110415842.X

(51) Int. Cl.
*H05B 45/14*     (2020.01)
*H05B 45/00*     (2022.01)
(Continued)

(52) U.S. Cl.
CPC ............. *H05B 45/14* (2020.01); *H05B 45/00* (2020.01); *H05B 45/24* (2020.01); *H05B 45/345* (2020.01);
(Continued)

(58) Field of Classification Search
CPC ........ H05B 45/14; H05B 45/00; H05B 45/24; H05B 45/345; H05B 45/37; H05B 45/3725; H05B 45/50; H05B 47/24; Y02B 20/30

See application file for complete search history.

(56) References Cited

U.S. PATENT DOCUMENTS

| 4,642,550 A | 2/1987 | Illuzzi et al. |
| 6,888,383 B1 | 5/2005 | Fairbanks |
(Continued)

FOREIGN PATENT DOCUMENTS

| CN | 1222972 A | 7/1999 |
| CN | 1533021 A | 9/2004 |
(Continued)

OTHER PUBLICATIONS

How Do I Use a Transformer as an Inductor?—Electrical Engineering Stack Exchange, The Wayback Machine—https://web.archive.org/web/20130516193807/https://electronics.stackexhange.com/questions/33860/how-do-i-use-a-transformer-as-an-inductor (4 pages printed Sep. 27, 2021), 2012-2013.
(Continued)

*Primary Examiner* — Vibol Tan
(74) *Attorney, Agent, or Firm* — Faegre Drinker Biddle & Reath LLP

(57) ABSTRACT

System and method for regulating one or more currents. The system includes a system controller, an inductor, a first resistor, a switch and a first diode. The system controller includes a first controller terminal and a ground terminal, the system controller being configured to output a drive signal at the first controller terminal. The inductor includes a first inductor terminal and a second inductor terminal, the first inductor terminal being coupled to the ground terminal, the second inductor terminal being coupled to one or more light emitting diodes. The first resistor includes a first resistor
(Continued)

Figure 2 terminal and a second resistor terminal, the first resistor terminal being coupled to the ground terminal. The switch is configured to receive the drive signal and coupled to the second resistor terminal. The first diode includes a first diode terminal and a second diode terminal and coupled to the first resistor.

14 Claims, 9 Drawing Sheets

Related U.S. Application Data division of application No. 16/359,926, filed on Mar. 20, 2019, now Pat. No. 10,904,974, which is a division of application No. 13/344,880, filed on Jan. 6, 2012, now Pat. No. 10,299,322.

(51) Int. Cl.
  *H05B 45/24* (2020.01)
  *H05B 45/345* (2020.01)
  *H05B 45/37* (2020.01)
  *H05B 45/3725* (2020.01)
  *H05B 45/50* (2022.01)

(52) U.S. Cl.
  CPC ......... *H05B 45/37* (2020.01); *H05B 45/3725* (2020.01); *H05B 45/50* (2020.01); *Y02B 20/30* (2013.01)

(56) References Cited

U.S. PATENT DOCUMENTS

| | | | |
|---|---|---|---|
| 9,192,004 B2* | 11/2015 | Chen | H05B 45/385 |
| 9,232,574 B2* | 1/2016 | Veskovic | H05B 45/385 |
| 9,781,793 B2* | 10/2017 | Yan | H05B 45/30 |
| 9,907,130 B2* | 2/2018 | Chen | H05B 45/382 |
| 10,104,735 B2* | 10/2018 | Stevens, Jr. | H05B 47/16 |
| 10,299,322 B2 | 5/2019 | Zhou et al. | |
| 10,904,974 B2 | 1/2021 | Zhou et al. | |
| 11,051,379 B2 | 6/2021 | Zhou et al. | |
| 11,483,907 B2 | 10/2022 | Zhou et al. | |
| 11,751,300 B2 | 9/2023 | Zhou et al. | |
| 2005/0146310 A1 | 7/2005 | Orr | |
| 2005/0151518 A1 | 7/2005 | Schneiker et al. | |
| 2007/0024213 A1 | 2/2007 | Shteynberg et al. | |
| 2007/0182347 A1 | 8/2007 | Shteynberg et al. | |
| 2008/0278092 A1 | 11/2008 | Lys et al. | |
| 2009/0021968 A1 | 1/2009 | Komatsu et al. | |
| 2010/0110735 A1 | 5/2010 | Duan et al. | |
| 2010/0188002 A1 | 7/2010 | Hung et al. | |
| 2011/0149613 A1 | 6/2011 | Lanni | |
| 2011/0254457 A1 | 10/2011 | Marent et al. | |
| 2011/0273104 A1 | 11/2011 | Uchimoto et al. | |
| 2011/0292704 A1 | 12/2011 | Makino et al. | |
| 2011/0309759 A1 | 12/2011 | Shteynberg et al. | |
| 2012/0025736 A1 | 2/2012 | Singh et al. | |
| 2013/0147379 A1 | 6/2013 | Zhou et al. | |
| 2014/0300274 A1 | 10/2014 | Acatrinei | |
| 2017/0303353 A1 | 10/2017 | Guang | |
| 2019/0327803 A1 | 10/2019 | Zhou et al. | |
| 2019/0327804 A1 | 10/2019 | Zhou et al. | |
| 2021/0100081 A1 | 4/2021 | Zhou et al. | |
| 2021/0282240 A1 | 9/2021 | Zhou et al. | |

FOREIGN PATENT DOCUMENTS

| | | |
|---|---|---|
| CN | 1575539 A | 2/2005 |
| CN | 101155446 A | 4/2008 |
| CN | 101527990 A | 9/2009 |
| CN | 101801138 A | 8/2010 |
| CN | 101909394 A | 12/2010 |
| CN | 102105007 A | 6/2011 |
| CN | 102164439 A | 8/2011 |
| CN | 102208870 A | 10/2011 |
| CN | 102223067 A | 10/2011 |
| CN | 102237811 A | 11/2011 |
| CN | 102263492 A | 11/2011 |
| CN | 202261964 U | 5/2012 |
| CN | 103956900 A | 7/2014 |
| TW | 200822799 A | 5/2008 |
| TW | 200952541 A | 12/2009 |
| TW | 201003355 A | 1/2010 |
| TW | 201143533 A | 12/2011 |
| TW | I413454 B | 10/2013 |
| WO | 2010/046065 A1 | 4/2010 |

OTHER PUBLICATIONS

Transformers as Inductors (Weird Results)—Electrical Engineering Stack Exchange, The Wayback Machine—https://web.archive.org/web/20130516135204/https://electronics.stackexhange.com/questions/45318/transformers-as-inductors-weird-results (2 pages printed Sep. 27, 2021), 2012-2013.
Balog et al., "Coupled-Inductor Filter: A Basic Filter Building Block," IEEE Transactions on Power Electronics, 28:1 (Jan. 2013), pp. 537-546.
Betten et al., "The Parallel Universe of Negative-Input Voltage," Power Electronics Technology, pp. 32-35, Jul. 2008.
Chinese Patent Office, Office Action dated Jan. 8, 2016, in Application No. 201410053177.8.
Chinese Patent Office, Office Action dated Mar. 16, 2017, in Application No. 201410053177.8.
Chinese Patent Office, Office Action dated May 14, 2015, in Application No. 201410053177.8.
Chinese Patent Office, Office Action dated Nov. 22, 2013, in Application No. 201110415842.X.
Excelliance MOS Corporation, "EM8822A Single Stage Buck/Buck-Boost PFC Controller for LED Lighting," Mar. 21, 2014 (9 pages).
National Semiconductor Corporation, "LM22670 Evaluation Board Inverting Topology and Application Notes," Application Note 1888, Oct. 14, 2008.
Sutcliffe (copyright holder), "Microcontroller Interfacing—Part 10: Input Protection," https://www.w9xt.com/page_microdesign_pt10_input_protection.html, published online: May 11, 2011 (4 pages).
Taiwan Patent Office, Office Action dated Apr. 28, 2016, in Application No. 103140246.
Taiwan Patent Office, Office Action dated Jul. 30, 2014, in Application No. 101101625.
Taiwan Patent Office, Office Action dated Jun. 4, 2016, in Application No. 103140247.
Taiwan Patent Office, Office Action dated Nov. 10, 2015, in Application No. 103140246.
Taiwan Patent Office, Office Action dated Nov. 10, 2015, in Application No. 103140247.
Taiwan Patent Office, Office Action dated Nov. 6, 2018, in Application No. 103140247.
Wu, Jian-Fu; "Design of LED Circuit," National Chip Implementation Center (CIC) Journal, 136, dated Feb. 2012, from http://www.cic.org.tw/tpd/enews/main.jsp?h_year=101&Submit=%E7%A2%BA%E8 %AA%8D.
Wuidart, L., "Topologies for Switched Mode Power Supplies," Application Notes of ST Microelectronics, Mar. 1, 2003.
United States Patent and Trademark Office, Notice of Allowance dated Apr. 24, 2023, in U.S. Appl. No. 17/328,539.
United States Patent and Trademark Office, Office Action mailed Feb. 26, 2024, in U.S. Appl. No. 18/224,950.

* cited by examiner

SYSTEMS AND METHODS FOR REGULATING LED CURRENTS

1. CROSS-REFERENCES TO RELATED APPLICATIONS

This application is a continuation of U.S. patent application Ser. No. 17/121,996, filed Dec. 15, 2020, which is a divisional of U.S. patent application Ser. No. 16/359,926, filed Mar. 20, 2019, which is a divisional of U.S. patent application Ser. No. 13/344,880, filed Jan. 6, 2012, which claims priority to Chinese Patent Application No. 201110415842.X, filed Dec. 8, 2011, all of the above applications being commonly assigned and incorporated by reference herein for all purposes.

2. BACKGROUND OF THE INVENTION

The present invention is directed to integrated circuits. More particularly, the invention provides systems and methods for regulating currents. Merely by way of example, the invention has been applied to regulate currents flowing through light-emitting-diodes (LEDs). But it would be recognized that the invention has a much broader range of applicability.

Light emitting diodes (LEDs) have been widely used in various electronics applications. LEDs have been recognized for their significant advantages over other lighting sources, such as incandescent bulbs. For example, such advantages include high efficiency and long lifetime. But, challenges remain for low-power LED applications, such as poor accuracy of current, low efficiency of light conversion, and large size of printed-circuit-board (PCB). Poor accuracy of current usually decreases the lifetime of LEDs, and low efficiency of light conversion often increases heat generation, which may also reduce the lifetime of LEDs.

FIG. 1 is a simplified conventional diagram showing a system for driving LEDs. The system 100 includes a system controller 102, a snubber circuit 116, a transformer 118, a rectifying diode 132, a capacitor 134, one or more LEDs 136, a power switch 138, a current-sensing resistor 140, and two resistors 142 and 144. The system controller 102 includes terminals 104, 106, 108, 110, 112 and 114. The snubber circuit 116 includes a resistor 120, a capacitor 122 and a diode 124. The transformer 118 includes a primary winding 126, a secondary winding 128 and an auxiliary winding 130. For example, the power switch 138 is a transistor.

If the switch 138 is closed (e.g., on), a primary current 148 flows through the primary winding 126, the switch 138 and the resistor 140, and the transformer 118 stores energy. The resistor 140 generates a current-sensing signal 150 which is detected at the terminal 114 (e.g., CS). If the switch 138 is open (e.g., off), the energy stored in the transformer 118 is released to drive the one or more LEDs 136. Information about an output voltage 152 associated with the one or more LEDs 136 is extracted through the auxiliary winding 130. The auxiliary winding 130, together with the resistors 142 and 144, generates a feedback signal 146 that is detected at the terminal 106 (e.g., FB). Based on at least the current-sensing signal 150 and the feedback signal 146, the system controller 102 outputs a gate drive signal 152 through the terminal 112 (e.g., GATE) to drive the switch 138 in order to regulate a current 154 that flows through the one or more LEDs 136.

But the system 100 often has low efficiency in power transfer, and such low efficiency usually results from low efficiency of the transformer 118 and/or energy loss in the snubber circuit 116. Additionally, many peripheral devices of the system 100 may not satisfy certain requirements for the PCB size.

Hence it is highly desirable to improve the techniques of driving LEDs.

3. BRIEF SUMMARY OF THE INVENTION

The present invention is directed to integrated circuits. More particularly, the invention provides systems and methods for regulating currents. Merely by way of example, the invention has been applied to regulate currents flowing through light-emitting-diodes (LEDs). But it would be recognized that the invention has a much broader range of applicability.

According to one embodiment, a system for regulating one or more currents includes a system controller, an inductor, a first resistor, a switch and a first diode. The system controller includes a first controller terminal and a ground terminal, the system controller being configured to output a drive signal at the first controller terminal. The inductor includes a first inductor terminal and a second inductor terminal, the first inductor terminal being coupled to the ground terminal, the second inductor terminal being coupled to one or more light emitting diodes. The first resistor includes a first resistor terminal and a second resistor terminal, the first resistor terminal being coupled to the ground terminal. The switch is configured to receive the drive signal and coupled to the second resistor terminal. Moreover, the first diode includes a first diode terminal and a second diode terminal and coupled to the first resistor, the second diode terminal being coupled to the one or more light emitting diodes.

According to another embodiment, a system for regulating one or more currents includes a system controller, a transformer, a first resistor, a switch, and a first diode. The system controller includes a first controller terminal and a ground terminal, the system controller being configured to output a drive signal at the first controller terminal. The transformer includes a primary winding and a secondary winding, the primary winding including a first winding terminal and a second winding terminal, the secondary winding including a third winding terminal and a fourth winding terminal, the first winding terminal being coupled to the ground terminal, the second winding terminal being coupled to one or more light emitting diodes, the third winding terminal being coupled to the ground terminal. The first resistor includes a first resistor terminal and a second resistor terminal, the first resistor terminal being coupled to the ground terminal. The switch is configured to receive the drive signal and coupled to the second resistor terminal. Additionally, the first diode includes a first diode terminal and a second diode terminal and coupled to the first resistor, the second diode terminal being coupled to the one or more light emitting diodes.

According to yet another embodiment, a system for regulating one or more currents includes a system controller that is configured to output a drive signal to a switch and to receive a sensed signal from a resistor connected to the switch and an inductor, the resistor and the inductor being connected directly or indirectly to one or more light emitting diodes. Additionally, the drive signal is associated with one or more switching periods, each of the one or more switching periods including an on-time period for the switch and an off-time period for the switch. Moreover, each of the one or more switching periods is equal to a ratio multiplied by a demagnetization period for a demagnetization process associated with the inductor, the ratio being larger than 1. Furthermore, a first current flowing through the one or more light emitting diodes is proportional to a peak magnitude of the sensed signal within each of the one or more switching periods.

According to yet another embodiment, a system for regulating one or more currents includes a modulation-and-drive component, a sample-and-hold component, an amplification component, an error amplifier, and a comparator. The modulation-and-drive component is configured to output a drive signal to a switch, the drive signal being associated with at least one switching period including an on-time period for the switch and a demagnetization period for a demagnetization process. The sample-and-hold component is configured to receive a sensed signal related to a current flowing through the switch, sample the sensed signal at the middle of the on-time period, and hold the sampled sensed signal. The amplification component is configured to receive the held and sampled sensed signal during the demagnetization period and generate an amplified signal. In addition, the error amplifier is configured to receive the amplified signal during the demagnetization period and generate, with at least a first capacitor, an integrated signal. Moreover, the comparator is configured to receive at least the integrated signal and output a comparison signal to the modulation-and-drive component based on at least information associated with the integrated signal.

In another embodiment, a system for regulating one or more currents includes a modulation-and-drive component, a signal-holding component, an amplification component, an error amplifier, and a comparator. The modulation-and-drive component is configured to output a drive signal to a switch, the drive signal being associated with at least one switching period including an on-time period for the switch and a demagnetization period for a demagnetization process. The amplification component is configured to, during the demagnetization period, receive a sensed signal related to a first current flowing through the switch and generate an amplified signal. Additionally, the error amplifier is configured to receive the amplified signal during the demagnetization period and generate, with at least a first capacitor, an integrated signal. Moreover, the comparator is configured to receive at least the integrated signal and output a comparison signal to the modulation-and-drive component based on at least information associated with the integrated signal.

In yet another embodiment, a method for regulating one or more currents includes receiving a sensed signal from a resistor connected to a switch and an inductor, and processing information associated with the sensed signal. In addition, the method includes generating a drive signal for the switch based on at least information associated with the sensed signal, processing information associated with the drive signal, and generating a current flowing through one or more light emitting diodes based on at least information associated with the drive signal, the one or more light emitting diodes being connected directly or indirectly to the resistor and the inductor. Further, the drive signal is associated with one or more switching periods, each of the one or more switching periods including an on-time period for the switch and an off-time period for the switch. Each of the one or more switching periods is equal to a ratio multiplied by a demagnetization period for a demagnetization process associated with the inductor, the ratio being larger than 1. Moreover, the current is proportional to a peak magnitude of the sensed signal within each of the one or more switching periods.

In yet another embodiment, a method for regulating one or more currents includes generating a drive signal for a switch, the drive signal being associated with at least one switching period including an on-time period for the switch and a demagnetization period for a demagnetization process. The method further includes receiving a sensed signal related to a current flowing through the switch, processing information associated with the sensed signal, and sampling the sensed signal at the middle of the on-time period. In addition, the method includes holding the sampled sensed signal, receiving the held and sampled sensed signal during the demagnetization period, and processing information associated with the received held and sampled sensed signal. The method also includes generating an amplified signal based on at least information associated with the received held and sampled sensed signal, receiving the amplified signal, and processing information associated with the amplified signal. Furthermore, the method includes generating an integrated signal based on at least information associated with the amplified signal, receiving at least the integrated signal, processing information associated with the integrated signal, and generating a comparison signal based on at least information associated with the integrated signal.

In yet another embodiment, a method for regulating one or more currents includes generating a drive signal for a switch, the drive signal being associated with at least one switching period including an on-time period for the switch and a demagnetization period for a demagnetization process. Additionally, the method includes receiving a sensed signal related to a current flowing through the switch during the demagnetization period, processing information associated with the received sensed signal, and generating an amplified signal based on information associated with the received sensed signal. The method also includes receiving the amplified signal, processing information associated with the amplified signal, and generating an integrated signal based on at least information associated with the amplified signal. Moreover, the method includes receiving at least the integrated signal, processing information associated with the integrated signal, generating a comparison signal based on at least information associated with the integrated signal, and receiving the comparison signal.

Depending upon embodiment, one or more benefits may be achieved. These benefits and various additional objects, features and advantages of the present invention can be fully appreciated with reference to the detailed description and accompanying drawings that follow.

4. BRIEF DESCRIPTION OF THE DRAWINGS

5. DETAILED DESCRIPTION OF THE INVENTION

The present invention is directed to integrated circuits. More particularly, the invention provides systems and methods for regulating currents. Merely by way of example, the invention has been applied to regulate currents flowing through light-emitting-diodes (LEDs). But it would be recognized that the invention has a much broader range of applicability.

Figure 1:
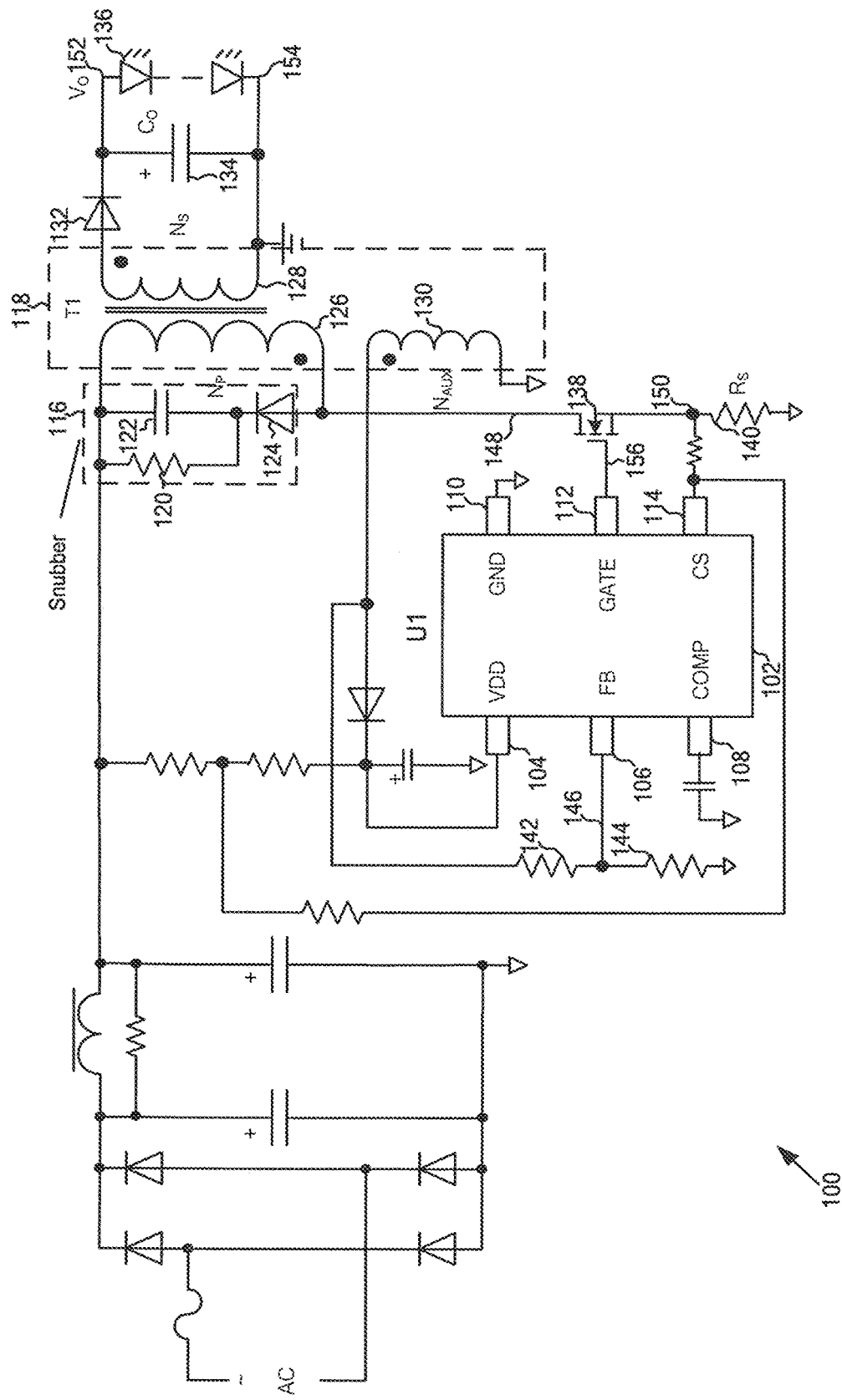
FIG. 1 is a simplified conventional diagram showing a system for driving LEDs.
Figure 2:
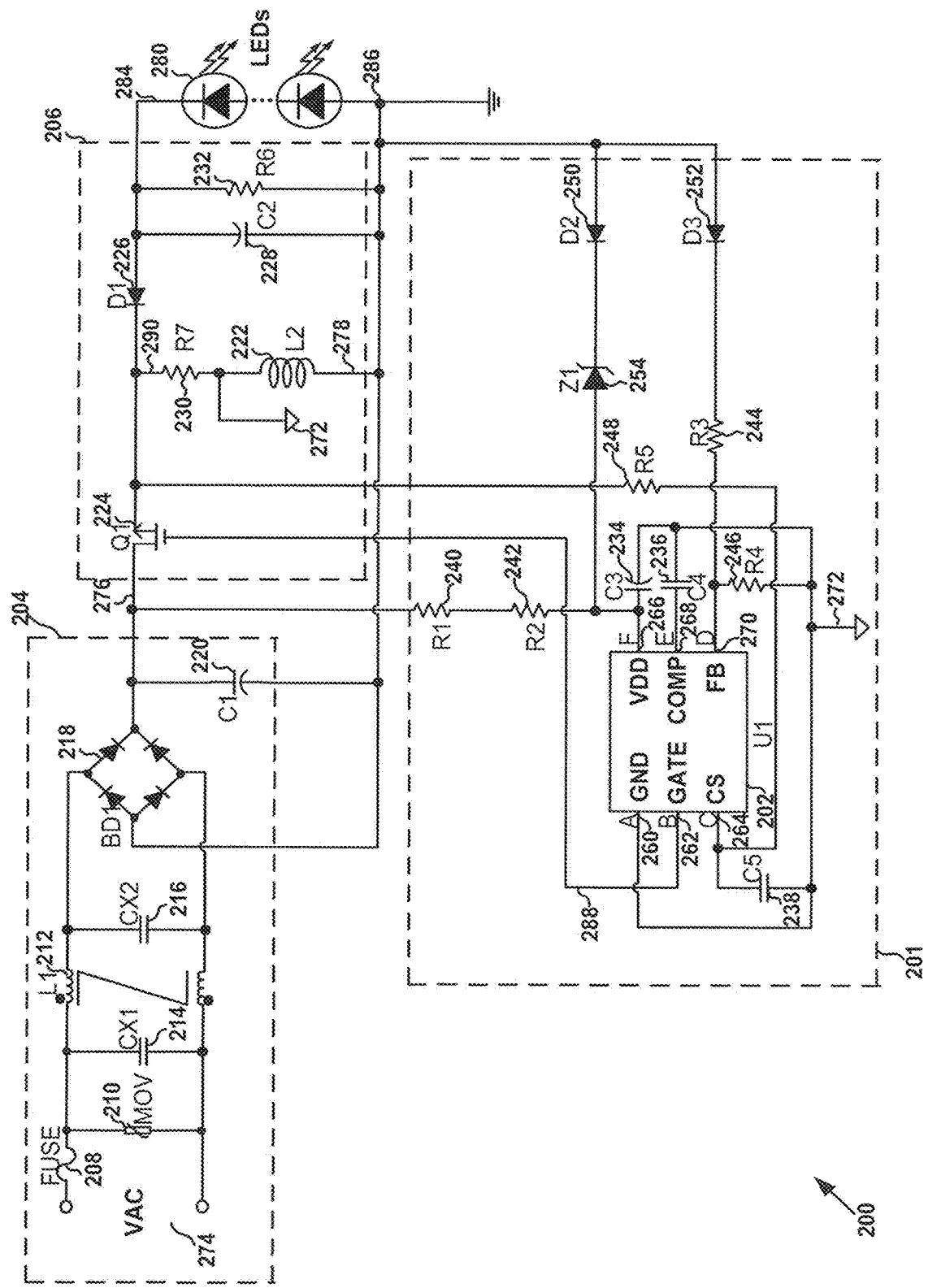
FIG. 2 is a simplified diagram showing a system for driving LEDs according to one embodiment of the present invention.

FIG. 2 is a simplified diagram showing a system for driving LEDs according to one embodiment of the present invention. This diagram is merely an example, which should not unduly limit the scope of the claims. One of ordinary skill in the art would recognize many variations, alternatives, and modifications.

The system 200 includes a regulation circuit 201, a rectifying-and-filtering circuit 204, and a buck-boost switching circuit 206. The rectifying-and-filtering circuit 204 includes a fuse 208, a varistor 210, a common-mode filtering inductor 212, two X capacitors 214 and 216, a rectifying bridge 218, and a filtering capacitor 220. The buck-boost switching circuit 206 includes a buck-boost inductor 222, a switch 224, a fly-back diode 226, a filtering capacitor 228, a current-sensing resistor 230, and an output dummy resistor 232. The regulation circuit 201 includes a system controller 202, three capacitors 234, 236 and 238, five resistors 240, 242, 244, 246 and 248, two diodes 250 and 252, and a Zener diode 254. The system controller 202 includes six terminals 260, 262, 264, 266, 268 and 270.

For example, different terminals of the system controller 202 are used for different purposes. Table 1 shows, as an example, description of the terminals in the system controller 202.

TABLE 1

| Terminals | Terminal Name | Description |
|---|---|---|
| 260 | GND | Controller or Chip ground |
| 262 | GATE | Gate drive |
| 264 | CS | Current sensing input |
| 266 | VDD | Power supply input |
| 268 | COMP | Control loop compensation |
| 270 | FB | Output voltage feedback |

In another example, a terminal of the resistor 230 and a terminal of the inductor 222 are each coupled to a chip ground 272 (e.g., a controller ground). The chip ground 272 may be referred to as ground hereinafter. In yet another example, loop compensation is carried out internally in the system controller 202. In yet another example, the terminal 268 (e.g., COMP) is omitted. In yet another example, the switch 224 is a transistor.

According to one embodiment, the inductor 222 (e.g., L2) has one terminal coupled to the chip ground 272 and the other terminal coupled to one or more LEDs 280. For example, the resistor 230 (e.g., R7) has one terminal coupled to the chip ground 272, and the other terminal coupled to the switch 224. In another example, the diode 226 (e.g., D1) has one terminal (e.g., a cathode terminal) coupled to the resistor 230, and the other terminal (e.g., an anode terminal) coupled to the one or more LEDs 280. In yet another example, the terminal 264 (e.g., CS) is coupled to the chip ground 272 through the capacitor 238 (e.g., C5), and coupled to both the resistor 230 (e.g., R7) and the switch 224 through the resistor 248 (e.g., R5). In yet another example, the terminal 270 (e.g., FB) is coupled to the chip ground 272 through the resistor 246 (e.g., R4), and coupled to the inductor 222 (e.g., L2) through the resistor 244 (e.g., R3) and the diode 252 (e.g., D3). In yet another example, the terminal 262 (e.g., GATE) is coupled to the switch 224 (e.g., at a gate terminal of the switch 224). In yet another example, the terminal 260 (e.g., GND) is coupled to the chip ground 272. The resistor 248 (e.g., R5) and the capacitor 238 (e.g., C5) are omitted in some embodiments.

According to another embodiment, an AC input 274 is applied to the rectifying-and-filtering circuit 204, which generates an input signal 276. For example, the regulation circuit 201 receives the input signal 276, and outputs a gate drive signal 288 through the terminal 262 (e.g., GATE) to drive the switch 224. In another example, the buck-boost switching circuit 206 receives the input signal 276 for driving the one or more LEDs 280. In yet another example, a switching period of the system 200 includes an on-time period, $T_{on}$, during which the switch 224 is closed (e.g., on), and an off-time period, $T_{off}$, during which the switch 224 is open (e.g., off).

According to yet another embodiment, when the switch 224 is closed (e.g., on), a current 278 flows through the resistor 230 and the inductor 222. For example, the inductor 222 stores energy. In another example, a voltage signal 290 is generated by the resistor 230. In yet another example, the voltage signal 290 is proportional in magnitude to the product of the current 278 and the resistance of the resistor 230. In yet another example, the voltage signal 290 is detected at the terminal 264 (e.g., CS) through the resistor 248.

When the switch 224 is open (e.g., off), the off-time period $T_{off}$ begins, and a demagnetization process of the inductor 222 starts according to some embodiments. For example, at least part of the current 278 flows from the inductor 222 to the one or more LEDs 280 and flows through the diode 226. In another example, the resistor 232 has a large resistance, and a current 284 that flows through the one or more LEDs 280 is close, in magnitude, to the current 278. In yet another example, an output voltage signal 286 associated with the one or more LEDs 280 is detected at the terminal 270 (e.g., FB) through a resistor divider that includes the resistor 244 and the resistor 246. In yet another example, the voltage signal 286 is higher than the voltage of the chip ground 272 during the demagnetization process of the inductor 222. In yet another example, after the demagnetization process of the inductor 222 is completed, the voltage signal 286 decreases to a low value in magnitude. In yet another example, the system 200 operates with a broad range of inputs and output loads, such as an input range of AC 85V~264V, and an output load of three or more LEDs.

In another embodiment, the peak value of the current 278 in each switching period of the system 200 is kept approximately constant by monitoring the voltage signal 290 through the terminal 264 (e.g., CS). For example, the demagnetization period of the inductor 222 is detected by monitoring the voltage signal 286 through the terminal 270 (e.g., FB). In another example, a switching period of the system 200 is N times the demagnetization period of the inductor 222, where N is a ratio larger than 1. Thus, an average magnitude of the current 284 that flows through the one or more LEDs 280 can be determined based on the following equation according to certain embodiments:

$$I_{LED} = \frac{1}{2 \times N} \times \frac{V_{TH\_OC}}{R7} \qquad \text{(Equation 1)}$$

where km represents the average magnitude of the current 284 that flows through the one or more LEDs 280, N represents the ratio between the switching period of the system 200 and the demagnetization period of the inductor 222, $V_{TH\_OC}$ represents the peak value of the voltage signal 290, and R7 represents the resistance of the resistor 230.

Figure 3A:
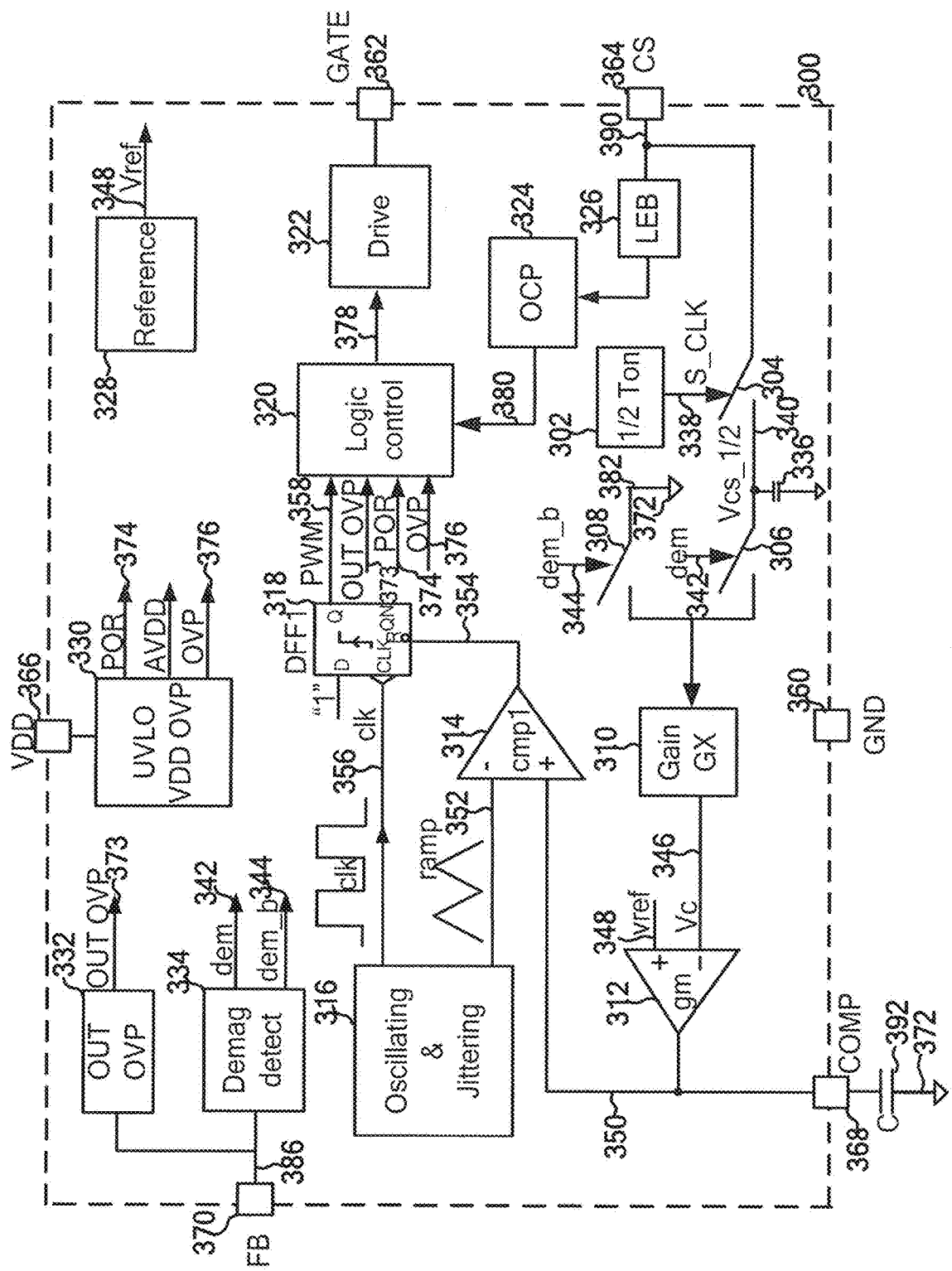
FIG. 3(a) is a simplified diagram showing certain components of a system controller for driving LEDs according to one embodiment of the present invention.

FIG. 3(a) is a simplified diagram showing certain components of a system controller for driving LEDs according to one embodiment of the present invention. This diagram is merely an example, which should not unduly limit the scope of the claims. One of ordinary skill in the art would recognize many variations, alternatives, and modifications.

The system controller 300 includes a timing component 302, three switches 304, 306 and 308, a gain stage 310 (e.g., an amplifying component), an amplifier 312, a comparator 314, an oscillating-and-jittering component 316, a flip-flop 318, a logic control component 320, a gate drive component 322, an over-current-protection (OCP) component 324, a leading-edge-blanking (LEB) component 326, a reference-signal generator 328, a voltage-signal generator 330, an output over-voltage-protection (OVP) component 332, a demagnetization detector 334, and a capacitor 336. In addition, the system controller 300 includes terminals 360, 362, 364, 366, 368 and 370. For example, the system controller 300 is the same as the system controller 202. In another example, the terminals 360, 362, 364, 366, 368 and 370 are the same as the terminals 260, 262, 264, 266, 268 and 270, respectively. In yet another example, the amplifier 312 includes an operational transconductance amplifier. In yet another example, the amplifier 312 and a capacitor 392 are included in an integrator.

According to one embodiment, the system controller 300 is used to replace the system controller 202 as part of the system 200. For example, a current-sensing signal 390 that is associated with a current (e.g., the current 278) flowing through the inductor 222 and the resistor 230 is received at the terminal 364 (e.g., CS). In another example, the timing component 302 generates a timing signal 338 to close the switch 304 for a predetermined period of time during the on-time period $T_{on}$ to sample the signal 390. In yet another example, a detection signal 340 is stored on the capacitor 336. In yet another example, as the signal 390 increases in magnitude during the predetermined period of time, the detection signal 340 increases in magnitude. In yet another example, the switch 304 is opened (e.g., off) immediately after the predetermined period of time (e.g., at the midpoint of the on-time period $T_{on}$). Thus, the current-sensing signal 390 is sampled (e.g., at the midpoint of the on-time period $T_{on}$), and the sampled signal is then held (e.g., stored) on the capacitor 336 according to certain embodiments.

In another embodiment, the demagnetization component 334 receives at the terminal 370 (e.g., FB) a feedback signal 386 that is associated with an output voltage signal (e.g., the signal 286) associated with the one or more LEDs 280. For example, the feedback signal 386 is related to a demagnetization process of the inductor 222. In another example, in response, the demagnetization component 334 outputs a demagnetization signal 342 and a complementary signal 344. In yet another example, during the demagnetization process of the inductor 222, the demagnetization signal 342 is at a logic high level and the complementary signal 344 is at a logic low level. In yet another example, after the demagnetization process of the inductor 222 ends, the demagnetization signal 342 is at the logic low level and the complementary signal 344 is at the logic high level.

According to yet another embodiment, if the demagnetization signal 342 is at the logic high level and the complementary signal 344 is at the logic low level, the switch 306 is closed (e.g., on) and the switch 308 is open (e.g., off). For example, the gain stage 310 receives the stored detection signal 340 through the switch 306 and outputs an amplified signal 346 to the amplifier 312. In another example, the amplifier 312 receives a reference signal 348 (e.g., $V_{ref}$) from the reference-signal generator 328. In yet another example, the amplifier 312, in response, generates an integrated signal 350 with the capacitor 392, based on the amplified signal 346 and the reference signal 348. In yet another example, the comparator 314 receives the integrated signal 350 and a ramping signal 352 from the oscillating-and-jittering component 316, and generates a comparison signal 354. In yet another example, the flip-flop 318 receives the comparison signal 354 and a clock signal 356 from the oscillating-and-jittering component 316, and outputs a modulation signal 358 to the logic control component 320. In yet another example, the logic control component 320 also receives a signal 373 from the output OVP component 332, two signals 374 and 376 from the voltage-signal generator 330, and a signal 380 from the OCP component 324. In yet another example, in response, the logic control component 320 outputs a signal 378 to the gate drive component 322 to affect an on-time period of the switch 224. In yet another example, the signal 378 is a pulse-width-modulation (PWM) signal. An average current of the one or more LEDs 280 is proportional to an average current of the inductor 222 during a demagnetization process of the inductor 222 by a predetermined ratio (e.g., the predetermined ratio being equal to 1) according to certain embodiments. For example, the average current of the one or more LEDs 280 can be determined according to the following equation:

$$I_{LED} = \frac{V_{ref}}{R7 * G} \qquad \text{(Equation 2)}$$

where $I_{LED}$ represents the average current of the one or more LEDs 280, $V_{ref}$ represents the reference signal 348, R7 represents the resistance of the resistor 230, and G represents a gain of the gain stage 310. In another example, the average current of the one or more LEDs 280 is constant in magnitude.

In another embodiment, if the demagnetization signal 342 is at the logic low level and the complementary signal 344 is at the logic high level, the switch 306 is open (e.g., off) and the switch 308 is closed (e.g., on). For example, the gain stage 310 receives a signal 382 (e.g., 0 V) from a chip ground 372.

Figure 3B:
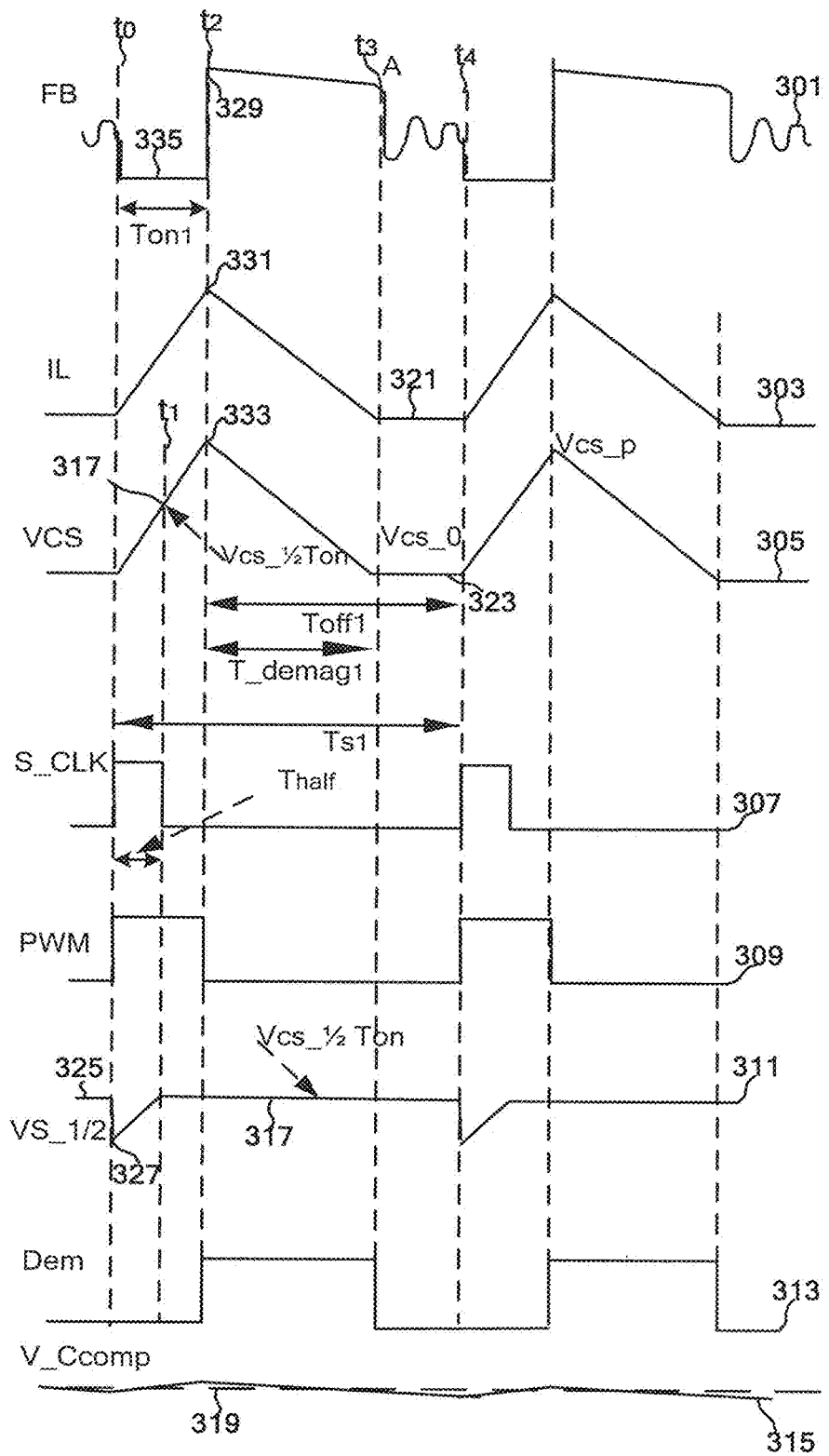
FIG. 3(b) is a simplified timing diagram for the system controller according to one embodiment of the present invention.

FIG. 3(b) is a simplified timing diagram for the system controller 300 according to one embodiment of the present invention. This diagram is merely an example, which should not unduly limit the scope of the claims. One of ordinary skill in the art would recognize many variations, alternatives, and modifications.

The waveform 301 represents the feedback signal 386 as a function of time, the waveform 303 represents the current that flows through the inductor 222 as a function of time, and the waveform 305 represents the current-sensing signal 390 as a function of time. Additionally, the waveform 307 represents the timing signal 338 as a function of time, the waveform 309 represents the modulation signal 358 as a function of time, and the waveform 311 represents the detection signal 340 as a function of time. Furthermore, the waveform 313 represents the demagnetization signal 342 as a function of time, and the waveform 315 represents the integrated signal 350 as a function of time.

Five time periods $T_{on1}$, $T_{half}$, $T_{off1}$, $T_{demag1}$ and $T_{s1}$ are shown in FIG. 3(b). The time period $T_{on1}$ starts at time $t_0$ and ends at time $t_2$, the time period $T_{half}$ starts at the time $t_0$ and ends at time $t_1$, and the time period $T_{off1}$ starts at the time $t_2$ and ends at time $t_4$. In addition, the time period $T_{demag1}$ starts at the time $t_2$ and ends at time $t_3$, and the time period $T_{s1}$ starts at the time $t_0$ and ends at the time $t_4$. For example, $t_0 \leq t_1 \leq t_2 \leq t_3 \leq t_4$. In another example, $t_1$ is at the midpoint of the time period $T_{on1}$. In yet another example, $T_{half}$ is equal to half of $T_{on1}$ (e.g., $$T_{half} = \frac{1}{2} T_{on1}).$$

According to one embodiment, the time period $T_{on1}$ represents the on-time period during which the switch 224 is closed (e.g., on). For example, the time period $T_{off1}$ represents the off-time period during which the switch 224 is open (e.g., off). In another example, the time period $T_{demag1}$ represents the demagnetization period of the inductor 222. In yet another example, the time period $T_{s1}$ represents the switching period of the system 200. In yet another example, the time period $T_{s1}$ includes the time period $T_{on1}$, and the time period $T_{off1}$. In yet another example, the time period $T_{on1}$ includes the time period $T_{half}$. In yet another example, the time period $T_{off1}$ includes the time period $T_{demag1}$.

According to another embodiment, at the beginning of the time period $T_{on1}$ (e.g., at to), the switch 224 is closed (e.g., on). For example, the current (e.g., the current 278) that flows through the inductor 222 increases in magnitude (e.g., as shown by the waveform 303). In another example, the current-sensing signal 390 increases in magnitude (e.g., as shown by the waveform 305). In yet another example, the timing signal 338 changes from a logic low level to a logic high level (e.g., as shown by the waveform 307), and the switch 304 is closed (e.g., on). In yet another example, the detection signal 340 decreases, in magnitude, from a previous value 325 to a low value 327 (e.g., 0) as shown by the waveform 311. In yet another example, the feedback signal 386 decreases to a low value 335 (e.g., 0) as shown by the waveform 301. In yet another example, the demagnetization signal 342 is at a logic low level (e.g., as shown by the waveform 313), and the switch 306 is open (e.g., off). In yet another example, the modulation signal 358 changes from the logic low level to the logic high level (e.g., as shown by the waveform 309).

According to yet another embodiment, during the time period $T_{half}$, the current that flows through the inductor 222 continues to increase in magnitude (e.g., as shown by the waveform 303). For example, the current-sensing signal 390 continues to increase in magnitude (e.g., as shown by the waveform 305). In another example, the timing signal 338 keeps at the logic high level (e.g., as shown by the waveform 307), and the switch 304 is closed (e.g., on). In yet another example, the detection signal 340 increases in magnitude to a peak value 317 (e.g., at $t_1$) as shown by the waveform 311. In yet another example, the feedback signal 386 keeps at the low value 335 (e.g., 0) as shown by the waveform 301. In yet another example, the demagnetization signal 342 keeps at the logic low level (e.g., as shown by the waveform 313), and the switch 306 is open (e.g., off). In yet another example, the modulation signal 358 keeps at the logic high level (e.g., as shown by the waveform 309) during the time period $T_{half}$. In yet another example, at the end of the time period $T_{half}$ (e.g., $t_1$), the timing signal 338 changes from the logic high level to the logic low level (e.g., as shown by the waveform 307), and the switch 304 is open (e.g., off).

According to yet another embodiment, during the rest of the time period $T_{on1}$ (e.g., after $t_1$), the detection signal 340 that is stored at the capacitor 336 keeps at the peak value 317 (e.g., $V_{cs\_1/2Ton}$). For example, the feedback signal 386 keeps at the low value 335 (e.g., 0) as shown by the waveform 301. In another example, the demagnetization signal 342 keeps at the logic low level (e.g., as shown by the waveform 313), and the switch 306 remains open (e.g., off). In yet another example, the modulation signal 358 keeps at the logic high level (e.g., as shown by the waveform 309). In yet another example, the current that flows through the inductor 222 continues to increase in magnitude to a peak value 331 (e.g., at $t_2$) as shown by the waveform 303. In yet another example, the current-sensing signal 390 continues to increase in magnitude to a value 333 (e.g., at $t_2$) as shown by the waveform 305. In yet another example, the peak value 317 of the detection signal 340 is equal to half of the peak value 333 of the current-sensing signal 390.

According to yet another embodiment, at the beginning of the time period $T_{off1}$ (e.g., at $t_2$), the switch 224 is open (e.g., off). For example, at least part of the current (e.g., the current 278) flows from the inductor 222 to the one or more LEDs 280. In another example, the feedback signal 386 changes from the low value 335 (e.g., 0) to a high value 329 (e.g., at $t_2$) as shown by the waveform 301. In yet another example, the demagnetization signal 342 changes from the logic low level to the logic high level (e.g., as shown by the waveform 313), which indicates that the demagnetization process of the inductor 222 starts. In yet another example, the switch 306 is closed (e.g., on). In another example, the gain stage 310 receives the stored detection signal 340, and outputs the amplified signal 346 to the amplifier 312 that outputs the integrated signal 350. In yet another example, the modulation signal 358 changes from the logic high level to the logic low level (e.g., as shown by the waveform 309).

According to yet another embodiment, during the time period $T_{demag1}$, the inductor 222 demagnetizes. For example, the magnitude of the feedback signal 386 is kept higher than the low value 335 as shown by the waveform 301. In another example, the current (e.g., the current 278) that flows through the inductor 222 and the resistor 230 decreases in magnitude to a low value 321 (e.g., as shown by the waveform 303). In yet another example, the current-sensing signal 390 decreases in magnitude to a low value 323 (e.g., as shown by the waveform 305). In yet another example, the timing signal 338 keeps at the logic low level, and the switch 304 remains open (e.g., off). In yet another example, the detection signal 340 keeps at the peak value 317 (e.g., as shown by the waveform 311). In yet another example, the demagnetization signal 342 keeps at the logic high level (e.g., as shown by the waveform 313), and the switch 306 remains closed (e.g., on). In yet another example, the integrated signal 350 keeps approximately at a magnitude 319 with a small fluctuation (e.g., as shown by the waveform 315). In yet another example, the modulation signal 358 keeps at the logic low level (e.g., as shown by the waveform 309) during the time period $T_{demag1}$. At the end of the time period $T_{demag1}$, the feedback signal 386 abruptly drops in magnitude as shown by the waveform 301, according to certain embodiments. For example, the demagnetization period of the inductor 222 is detected by monitoring the feedback signal 386 at the terminal 270 (e.g., FB).

In another embodiment, during the rest of the time period $T_{off1}$ (e.g., after the demagnetization process of the inductor 222 ends at $t_3$), the current that flows through the inductor 222 keeps at the low value 321 (e.g., as shown by the waveform 303). For example, the current-sensing signal 390 keeps at the low value 323 (e.g., as shown by the waveform 305). In another example, the timing signal 338 remains at the logic low level (e.g., as shown by the waveform 307), and the switch 304 remains open (e.g., off). In yet another example, the detection signal 340 keeps at the peak value 317 (e.g., as shown by the waveform 311). In yet another example, the demagnetization signal 342 keeps at the logic high level (e.g., as shown by the waveform 313). In yet another example, the integrated signal 350 keeps approximately at the magnitude 319 with a small fluctuation (e.g., as shown by the waveform 315). In yet another example, the modulation signal 358 keeps at the logic low level (e.g., as shown by the waveform 309).

At the beginning of a next switching period (e.g., at $t_4$), a new cycle starts according to certain embodiments. For example, the current that flows through the inductor 222 increases in magnitude (e.g., as shown by the waveform 303), and the current-sensing signal 390 increases in magnitude again (e.g., at $t_4$ as shown by the waveform 305). In another example, the timing signal 338 changes from the logic low level to the logic high level (e.g., at $t_4$ as shown by the waveform 307), and the switch 304 is closed (e.g., on) to sample the current-sensing signal 390 again. In yet another example, the integrated signal 350 keeps approximately at the magnitude 319 with a small fluctuation (e.g., as shown by the waveform 315) during the next switching period (e.g., because of a very limited loop bandwidth).

Figure 4A:
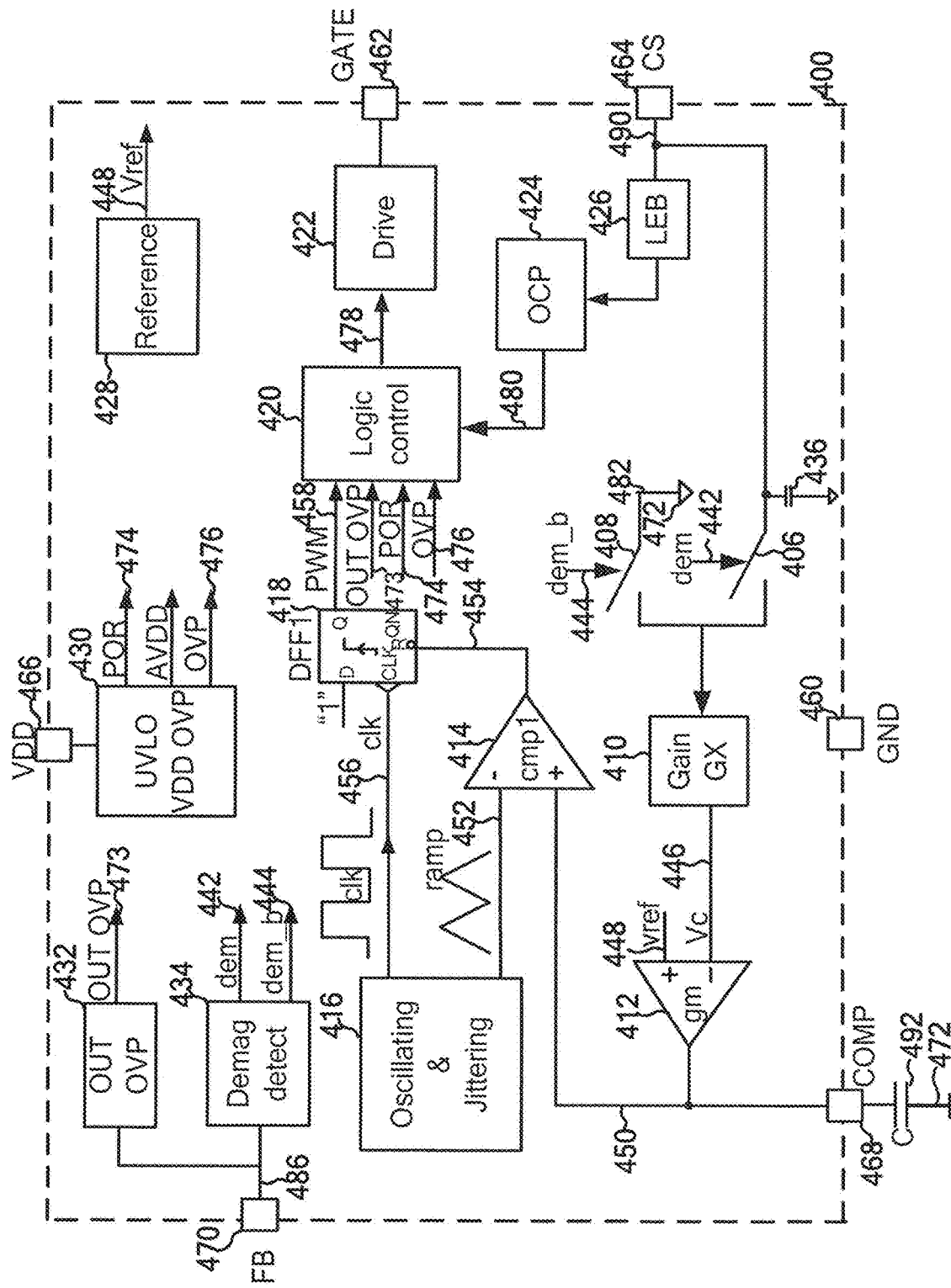
FIG. 4(a) is a simplified diagram showing certain components of a system controller for driving LEDs according to another embodiment of the present invention.

FIG. 4(a) is a simplified diagram showing certain components of a system controller for driving LEDs according to another embodiment of the present invention. This diagram is merely an example, which should not unduly limit the scope of the claims. One of ordinary skill in the art would recognize many variations, alternatives, and modifications.

The system controller 400 includes two switches 406 and 408, a gain stage 410 (e.g., an amplifying component), an amplifier 412, a comparator 414, an oscillating-and-jittering component 416, a flip-flop 418, a logic control component 420, a gate drive component 422, an OCP component 424, a LEB component 426, a reference-signal generator 428, a voltage-signal generator 430, an output OVP component 432, a demagnetization detector 434, and a capacitor 436. In addition, the system controller 400 includes terminals 460, 462, 464, 466, 468 and 470. For example, the system controller 400 is the same as the system controller 202. In another example, the terminals 460, 462, 464, 466, 468 and 470 are the same as 260, 262, 264, 266, 268 and 270, respectively. In yet another example, the amplifier 412 includes an operational transconductance amplifier. In yet another example, the amplifier 412 and a capacitor 492 are included in an integrator.

According to one embodiment, the system controller 400 is used to replace the system controller 202 as part of the system 200. For example, a current-sensing signal 490 that is associated with a current (e.g., the current 278) that flows through the inductor 222 and the resistor 230 is received at the terminal 464 (e.g., CS). In another example, the signal 490 is stored at the capacitor 436. In yet another example, the demagnetization component 434 receives at the terminal 470 (e.g., FB) a feedback signal 486 that is associated with an output voltage signal (e.g., the signal 286) associated with the one or more LEDs 280. In yet another example, the feedback signal 486 is related to a demagnetization process of the inductor 222. In yet another example, in response, the demagnetization component 434 outputs a demagnetization signal 442 and a complementary signal 444. In another example, during the demagnetization process of the inductor 222, the demagnetization signal 442 is at a logic high level and the complementary signal 444 is at a logic low level. In yet another example, after the demagnetization process of the inductor 222 ends, the demagnetization signal 442 is at the logic low level and the complementary signal 444 is at the logic high level. The capacitor 436 is removed in some embodiments.

According to another embodiment, if the demagnetization signal 442 is at the logic high level and the complementary signal 444 is at the logic low level, the switch 406 is closed (e.g., on) and the switch 408 is open (e.g., off). For example, the gain stage 410 receives the signal 490 (or the stored signal 490) through the switch 406 and outputs an amplified signal 446. In another example, the amplifier 412 receives the amplified signal 446, and a reference signal 448 (e.g., $V_{ref}$) from the reference-signal generator 428. In yet another example, the amplifier 412, in response, generates an integrated signal 450 with the capacitor 492, based on the amplified signal 446 and the reference signal 448. In yet another example, the comparator 414 receives the integrated signal 450, and a ramping signal 452 from the oscillating-and-jittering component 416. In yet another example, the comparator 414 outputs a comparison signal 454. In yet another example, the flip-flop 418 receives the comparison signal 454 and a clock signal 456 from the oscillating-and-jittering component 416, and outputs a modulation signal 458 to the logic control component 420. In yet another example, the logic control component 420 also receives a signal 473 from the output OVP component 432, two signals 474 and 476 from the voltage-signal generator 430, and a signal 480 from the OCP component 424. In yet another example, in response, the logic control component 420 outputs a signal 478 to the gate drive component 422 to affect an on-time period of the switch 224. In yet another example, the signal 478 is a PWM signal. An average current of the one or more LEDs 280 is proportional to an average current of the inductor 222 during a demagnetization process of the inductor 222 by a predetermined ratio (e.g., the predetermined ratio being equal to 1) according to certain embodiments. For example, the average current of the one or more LEDs 280 can be determined according to the following equation:

$$I_{LED} = \frac{V_{ref}}{R7 * G} \quad \text{(Equation 3)}$$

where $I_{LED}$ represents the average current of the one or more LEDs 280, $V_{ref}$ represents the reference signal 448, R7 represents the resistance of the resistor 230, and G represents a gain of the gain stage 410. In another example, the average current of the one or more LEDs 280 is constant in magnitude. In yet another example, if G equals 1, the gain stage 410 is omitted.

In another embodiment, if the complementary signal 444 is at the logic high level and the demagnetization signal 442 is at the logic low level, the switch 408 is closed (e.g., on) and the switch 406 is open (e.g., off). For example, the gain stage 410 receives a signal 482 (e.g., 0 V) from a chip ground 472.

Figure 4B:
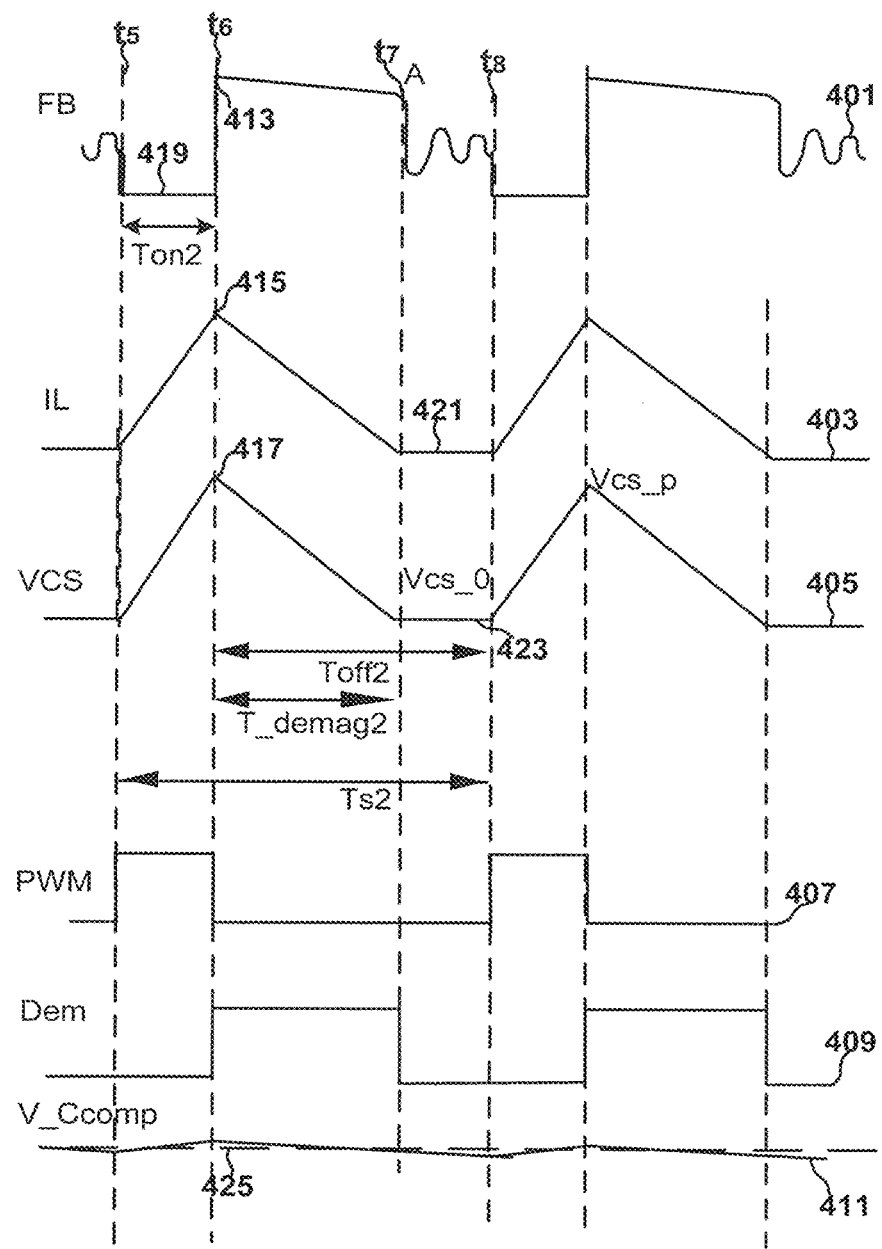
FIG. 4(b) is a simplified timing diagram for the system controller according to another embodiment of the present invention.

FIG. 4(*b*) is a simplified timing diagram for the system controller 400 according to another embodiment of the present invention. This diagram is merely an example, which should not unduly limit the scope of the claims. One of ordinary skill in the art would recognize many variations, alternatives, and modifications.

The waveform 401 represents the feedback signal 486 as a function of time, the waveform 403 represents the current that flows through the inductor 222 as a function of time, and the waveform 405 represents the current-sensing signal 490 as a function of time. Additionally, the waveform 407 represents the modulation signal 458 as a function of time, and the waveform 409 represents the demagnetization signal 442 as a function of time, and the waveform 411 represents the integrated signal 450 as a function of time.

Four time periods $T_{on2}$, $T_{off2}$, $T_{demag2}$ and $T_{s2}$ are shown in FIG. 4(*b*). The time period $T_{on2}$ starts at time $t_5$ and ends at time $t_6$, the time period $T_{off2}$ starts at the time $t_6$ and ends at time $t_8$, and the time period $T_{demag2}$ starts at the time $t_6$ and ends at the time $t_7$, and the time period $T_{s2}$ starts at the time $t_5$ and ends at the time $t_8$. For example, $t_5 \leq t_6 \leq t_7 \leq t_8$.

According to one embodiment, the time period $T_{on2}$ represents the on-time period during which the switch 224 is closed (e.g., on). For example, the time period $T_{off2}$ represents the off-time period during which the switch 224 is open (e.g., off). In another example, the time period $T_{demag2}$ represents the demagnetization period of the inductor 222. In yet another example, the time period $T_{s2}$ represents the switching period of the system 200. In yet another example, the time period $T_{s2}$ includes the time period $T_{on2}$ and the time period $T_{off2}$. In yet another example, the time period $T_{off2}$ includes the time period $T_{demag2}$.

According to another embodiment, at the beginning of the time period $T_{on2}$ (e.g., at $t_5$), the switch 224 is closed (e.g., on). For example, the current (e.g., the current 278) that flows through the inductor 222 increases in magnitude (e.g., as shown by the waveform 403). In another example, the current-sensing signal 490 increases in magnitude (e.g., as shown by the waveform 405). In yet another example, the feedback signal 486 decreases to a low value 419 (e.g., 0 at $t_5$) as shown by the waveform 401. In yet another example, the demagnetization signal 442 is at a logic low level (e.g., as shown by the waveform 409), and the switch 406 is open (e.g., off). In yet another example, the modulation signal 458 changes from a logic low level to a logic high level (e.g., as shown by the waveform 407).

According to yet another embodiment, during the time period $T_{on2}$, the current (e.g., the current 278) that flows through the inductor 222 continues to increase in magnitude to a peak value 415 (e.g., at $t_6$) as shown by the waveform 403. For example, the current-sensing signal 490 continues to increase in magnitude to a peak value 417 (e.g., at $t_6$) as shown by the waveform 405. In another example, the feedback signal 486 keeps at the low value 419 (e.g., 0) as shown by the waveform 401. In yet another example, the demagnetization signal 442 keeps at the logic low level (e.g., as shown by the waveform 409), and the switch 406 remains open (e.g., off). In yet another example, the modulation signal 458 keeps at the logic high level (e.g., as shown by the waveform 407).

According to yet another embodiment, at the beginning of the time period Tom (e.g., at $t_6$), the switch 224 is open (e.g., off). For example, at least part of the current (e.g., the current 278) flows from the inductor 222 to the one or more LEDs 280. In another example, the feedback signal 486 changes from the low value 419 (e.g., 0) to a high value 413 (e.g., at $t_6$) as shown by the waveform 401. In yet another example, the demagnetization signal 442 changes from the logic low level to the logic high level (e.g., as shown by the waveform 409), which indicates that the demagnetization process of the inductor 222 starts. In yet another example, the switch 406 is closed (e.g., on). In another example, the gain stage 410 receives the stored current-sensing signal 490, and outputs the amplified signal 446 to the amplifier 412 that outputs the integrated signal 450. In yet another example, the modulation signal 458 changes from the logic high level to the logic low level (e.g., as shown by the waveform 407).

According to yet another embodiment, during the time period $T_{demag2}$, the inductor 222 demagnetizes. For example, the magnitude of the feedback signal 486 is kept higher than the low value 419 (e.g., as shown by the waveform 401). In another example, the current (e.g., the current 278) that flows through the inductor 222 and the resistor 230 decreases in magnitude to a low value 421 (e.g., at $t_7$) as shown by the waveform 403. In yet another example, the current-sensing signal 490 decreases in magnitude to a low value 423 (e.g., at $t_7$) as shown by the waveform 405. In yet another example, the demagnetization signal 442 keeps at the logic high level (e.g., as shown by the waveform 409), and the switch 406 remains closed (e.g., on). In yet another example, the integrated signal 450 keeps approximately at a magnitude 425 with a small fluctuation (e.g., as shown by the waveform 411). In yet another example, the modulation signal 458 keeps at the logic low level (e.g., as shown by the waveform 407) during the time period $T_{demag2}$. At the end of the time period $T_{demag2}$, the feedback signal 486 abruptly drops in magnitude as shown by the waveform 401, according to certain embodiments. For example, the demagnetization period of the inductor 222 is detected by monitoring the feedback signal 486 at the terminal 270 (e.g., FB).

In another embodiment, during the rest of the time period $T_{off2}$ (e.g., after the demagnetization process of the inductor 222 ends at $t_7$), the current that flows through the inductor 222 keeps at the low value 421 (e.g., as shown by the waveform 403). For example, the current-sensing signal 490 keeps at the low value 423 (e.g., as shown by the waveform 405). In another example, the demagnetization signal 442 keeps at the logic high level (e.g., as shown by the waveform 409), and the switch 406 remains closed (e.g., on). In yet another example, the integrated signal 450 keeps approximately at the magnitude 425 with a small fluctuation (e.g., as shown by the waveform 411). In yet another example, the modulation signal 458 keeps at the logic low level (e.g., as shown by the waveform 407).

At the beginning of a next switching period (e.g., at $t_8$), new cycle starts according to certain embodiments. For example, the current that flows through the inductor 222 increases in magnitude again (e.g., as shown by the waveform 403), and the current-sensing signal 490 increases in magnitude again (e.g., as shown by the waveform 405). In another example, the integrated signal 450 keeps approximately at the magnitude 425 with a small fluctuation during the next switching period (e.g., as shown by the waveform 411) (e.g., because of a very limited loop bandwidth).

Figure 5:
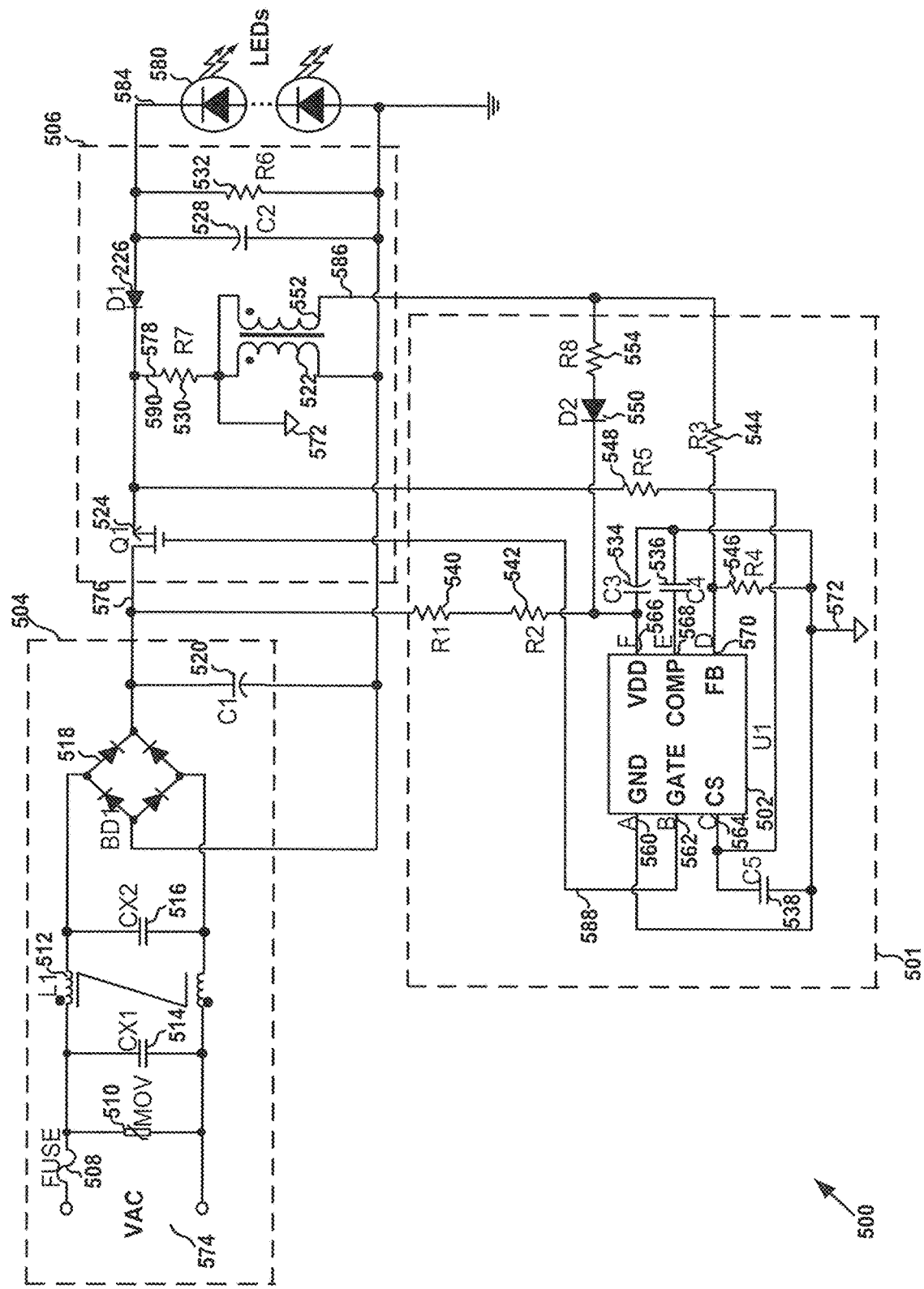
FIG. 5 is a simplified diagram showing a system for driving LEDs according to another embodiment of the present invention.

FIG. 5 is a simplified diagram showing a system for driving LEDs according to another embodiment of the present invention. This diagram is merely an example, which should not unduly limit the scope of the claims. One of ordinary skill in the art would recognize many variations, alternatives, and modifications.

The system 500 includes a regulation circuit 501, a rectifying-and-filtering circuit 504, and a buck-boost switching circuit 506. The rectifying-and-filtering circuit 504 includes a fuse 508, a varistor 510, a common-mode filtering inductor 512, two X capacitors 514 and 516, a rectifying bridge 518, and a filtering capacitor 520. The buck-boost switching circuit 506 includes a primary winding 522, a secondary winding 552, a switch 524, a fly-back diode 526, a filtering capacitor 528, a current-sensing resistor 530, and an output dummy resistor 532. The regulation circuit 501 includes a system controller 502, three capacitors 534, 536 and 538, six resistors 540, 542, 544, 546, 548 and 554, and a diode 550. The system controller 502 includes six terminals 560, 562, 564, 566, 568 and 570.

For example, a terminal of the resistor 530 and an end of the primary winding 522 are each coupled to a chip ground 572. In another example, the system controller 502 is the same as the system controller 202. In yet another example, the terminals 560, 562, 564, 566, 568 and 570 are the same as the terminals 260, 262, 264, 266, 268 and 270, respectively. In yet another example, loop compensation is carried out internally in the system controller 502, and the terminal 568 (e.g., COMP) is omitted. In yet another example, a switch 524 is a transistor.

According to one embodiment, the primary winding 522 has one terminal coupled to the chip ground 572 and the other terminal coupled to one or more LEDs 580. For example, the secondary winding 552 has one terminal coupled to the chip ground 572, and the other terminal coupled to the terminal 570 (e.g., FB) through a resistor 544. In another example, the resistor 530 (e.g., R7) has one terminal coupled to the chip ground 572, and the other terminal coupled to the switch 524. In yet another example, the diode 526 (e.g., D1) has one terminal (e.g., a cathode terminal) coupled to the resistor 530, and the other terminal (e.g., an anode terminal) coupled to the one or more LEDs 580. In yet another example, the terminal 564 (e.g., CS) is coupled to the chip ground 572 through the capacitor 538 (e.g., C5), and coupled to both the resistor 530 (e.g., R7) and the switch 524 through the resistor 548 (e.g., R5). In yet another example, the terminal 570 (e.g., FB) is coupled to the chip ground 572 through the resistor 546 (e.g., R4). In yet another example, the terminal 562 (e.g., GATE) is coupled to the switch 524 (e.g., at a gate terminal of the switch 524). In yet another example, the terminal 560 (e.g., GND) is coupled to the chip ground 572. The resistor 548 (e.g., R5) and the capacitor 538 (e.g., C5) are omitted in some embodiments.

According to another embodiment, an AC input 574 is applied to the rectifying-and-filtering circuit 504, which generates an input signal 576. For example, the regulation circuit 501 receives the input signal 576, and outputs a gate drive signal 588 through the terminal 562 (e.g., GATE) to drive the switch 524. In another example, the switching circuit 506 receives the input signal 576 for driving one or more LEDs 580. In yet another example, a switching period of the system 500 includes an on-time period, $T_{on}$, during which the switch 524 is closed (e.g., on), and an off-time period, $T_{off}$, during which the switch 524 is open (e.g., off).

According to yet another embodiment, when the switch 524 is closed (e.g., on), a current 578 flows through the resistor 530 and a transformer that includes the primary winding 522 and the secondary winding 552. For example, the transformer that includes the primary winding 522 and the secondary winding 552 stores energy. In another example, a voltage signal 590 is generated by the resistor 530. In yet another example, the voltage signal 590 is proportional in magnitude to the product of the current 578 and the resistance of the resistor 530. In yet another example, the voltage signal 590 is detected at the terminal 564 (e.g., CS) through the resistor 548.

When the switch 524 is open (e.g., off), the off-time period $T_{off}$ begins, and a demagnetization process of the primary winding 522 starts according to some embodiments. For example, at least part of the current 578 flows from the resistor 530 to the one or more LEDs 580 and flows through the diode 526. In another example, the resistor 532 has a large resistance, and a current 584 that flows through the one or more LEDs 580 is close, in magnitude, to the current 578. In yet another example, a voltage signal 586 associated with the secondary winding 552 is detected at the terminal 570 (e.g., FB) through a resistor divider that includes the resistors 544 and 546. In yet another example, the voltage signal 586 is higher than the voltage of the chip ground 572 during the demagnetization process of the primary winding 522. In yet another example, after the demagnetization process of the primary winding 522 is completed, the voltage signal 586 decreases to a low value in magnitude. In yet another example, the system 500 operates with a broad range of inputs and output loads, such as an output load of one or more LEDs (e.g., one LED).

In another embodiment, the peak value of the current 578 in each switching period of the system 500 is kept approximately constant by monitoring the voltage signal 590 at the terminal 564 (e.g., CS). For example, the demagnetization period of the primary winding 522 is detected by monitoring the voltage signal 586 at the terminal 570 (e.g., FB). In another example, a switching period of the system 500 is N times the demagnetization period of the primary winding 522, where N is a ratio larger than 1. Thus, an average magnitude of the current 584 that flows through the one or more LEDs 580 can be determined based on the following equation according to certain embodiments:

$$I_{LED} = \frac{1}{2 \times N} \times \frac{V_{TH\_OC}}{R7} \quad \text{(Equation 4)}$$

where $I_{LED}$ represents the average magnitude of the current 584 that flows through the one or more LEDs 580, N represents the ratio between the switching period of the system 500 and the demagnetization period of the primary winding 522, $V_{TH\_OC}$ represents the peak value of the voltage signal 590, and R7 represents the resistance of the resistor 530. For example, the system controller 502 is the same as the system controller 300, and the system controller 300 is used to replace the system controller 502 as part of the system 500. In yet another example, the system controller 502 is the same as the system controller 400, and the system controller 400 is used to replace the system controller 502 as part of the system 500.

Figure 6:
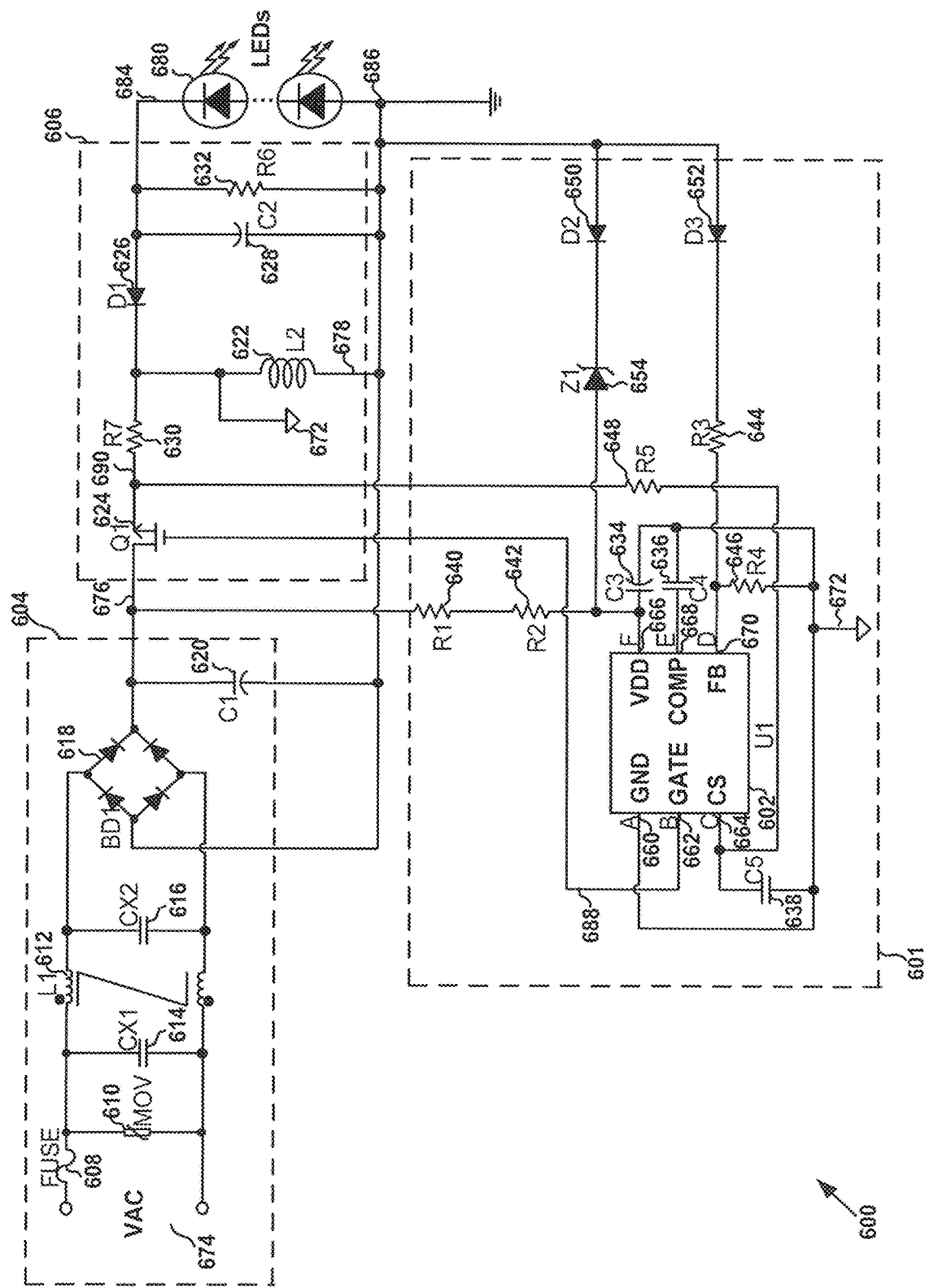
FIG. 6 is a simplified diagram showing a system for driving LEDs according to yet another embodiment of the present invention.

FIG. 6 is a simplified diagram showing a system for driving LEDs according to yet another embodiment of the present invention. This diagram is merely an example, which should not unduly limit the scope of the claims. One of ordinary skill in the art would recognize many variations, alternatives, and modifications.

The system 600 includes a regulation circuit 601, a rectifying-and-filtering circuit 604, and a buck-boost switching circuit 606. The rectifying-and-filtering circuit 604 includes a fuse 608, a varistor 610, a common-mode filtering inductor 612, two X capacitors 614 and 616, a rectifying bridge 618, and a filtering capacitor 620. The buck-boost switching circuit 606 includes a buck-boost inductor 622, a switch 624, a fly-back diode 626, a filtering capacitor 628, a current-sensing resistor 630, and an output dummy resistor 632. The regulation circuit 601 includes a system controller 602, three capacitors 634, 636 and 638, five resistors 640, 642, 644, 646 and 648, two diodes 650 and 652, and a Zener diode 654. The system controller 602 includes six terminals 660, 662, 664, 666, 668 and 670.

For example, a terminal of the resistor 630 and a terminal of the inductor 622 are each coupled to a chip ground 672. In another example, the system controller 602 is the same as the system controller 202. In yet another example, the terminals 660, 662, 664, 666, 668 and 670 are the same as the terminals 260, 262, 264, 266, 268 and 270, respectively. In yet another example, loop compensation is carried out internally in the system controller 602. In yet another example, the terminal 668 (e.g., COMP) is omitted. In yet another example, the switch 624 is a transistor.

According to one embodiment, the inductor 622 (e.g., L2) has one terminal coupled to the chip ground 672 and the other terminal coupled to one or more LEDs 680. For example, the resistor 630 (e.g., R7) has one terminal coupled to the chip ground 672, and the other terminal coupled to the switch 624. In another example, the diode 626 (e.g., D1) has one terminal (e.g., a cathode terminal) coupled to the chip ground 672, and the other terminal (e.g., an anode terminal) coupled to the one or more LEDs 680. In yet another example, the terminal 664 (e.g., CS) is coupled to the chip ground 672 through the capacitor 638 (e.g., C5), and coupled to both the resistor 630 (e.g., R7) and the switch 624 through the resistor 648 (e.g., R5). In yet another example, the terminal 670 (e.g., FB) is coupled to the chip ground 672 through the resistor 646 (e.g., R4), and coupled to the inductor 622 (e.g., L2) through the resistor 644 (e.g., R3) and the diode 652 (e.g., D3). In yet another example, the terminal 662 (e.g., GATE) is coupled to the switch 624 (e.g., at a gate terminal of the switch 624). In yet another example, the terminal 660 (e.g., GND) is coupled to the chip ground 672. The resistor 648 (e.g., R5) and the capacitor 638 (e.g., C5) are omitted in some embodiments.

According to another embodiment, an AC input 674 is applied to the rectifying-and-filtering circuit 604, which generates an input signal 676. For example, the regulation circuit 601 receives the input signal 676, and outputs a gate drive signal 688 through the terminal 662 (e.g., GATE) to drive the switch 624. In another example, the buck-boost switching circuit 606 receives the input signal 676 for driving one or more LEDs 680. In yet another example, a switching period of the system 600 includes an on-time period, $T_{on}$, during which the switch 624 is closed (e.g., on), and an off-time period, $T_{off}$, during which the switch 624 is open (e.g., off).

According to yet another embodiment, when the switch 624 is closed (e.g., on), a current 678 flows through the resistor 630 and the inductor 622. For example, the inductor 622 stores energy. In another example, a voltage signal 690 is generated by the resistor 630. In yet another example, the voltage signal 690 is proportional in magnitude to the product of the current 678 and the resistance of the resistor 630. In yet another example, the voltage signal 690 is detected at the terminal 664 (e.g., CS) through the resistor 648.

According to yet another embodiment, when the switch 624 is open (e.g., off), the off-time period $T_{off}$ begins, and a demagnetization process of the inductor 622 starts. For example, at least part of the current 678 flows from the inductor 622 to the one or more LEDs 680 and flows through the diode 626. In another example, the resistor 632 has a large resistance, and a current 684 that flows through the one or more LEDs 680 is close, in magnitude, to the current 678. In yet another example, an output voltage signal 686 associated with the one or more LEDs 680 is detected at the terminal 670 (e.g., FB) through a resistor divider that includes the resistor 644 and the resistor 646. In yet another example, the voltage signal 686 is higher than the voltage of the chip ground 672 during the demagnetization process of the inductor 622. In yet another example, after the demagnetization process of the inductor 622 is completed, the voltage signal 686 decreases to a low value in magnitude. In yet another example, the system 600 operates with a broad range of inputs and output loads, such as an input range of AC 85V~264V, and an output load of three or more LEDs.

According to yet another embodiment, the peak value of the current 678 in each switching period of the system 600 is kept approximately constant by monitoring the voltage signal 690 through the terminal 664 (e.g., CS). For example, the demagnetization period of the inductor 622 is detected by monitoring the voltage signal 686 through the terminal 670 (e.g., FB). In another example, a switching period of the system 600 is N times the demagnetization period of the inductor 622, where N is a ratio larger than 1. Thus, an average magnitude of the current 684 that flows through the one or more LEDs 680 can be determined based on the following equation according to certain embodiments:

$$I_{LED} = \frac{1}{2 \times N} \times \frac{V_{TH\_OC}}{R7} \qquad \text{(Equation 5)}$$

where $I_{LED}$ represents the average magnitude of the current 684 that flows through the one or more LEDs 680, N represents the ratio between the switching period of the system 600 and the demagnetization period of the inductor 622, $V_{TH\_OC}$ represents the peak value of the voltage signal 690, and R7 represents the resistance of the resistor 630. For example, the system controller 602 is the same as the system controller 300, and the system controller 300 is used to replace the system controller 602 as part of the system 600.

Figure 7:
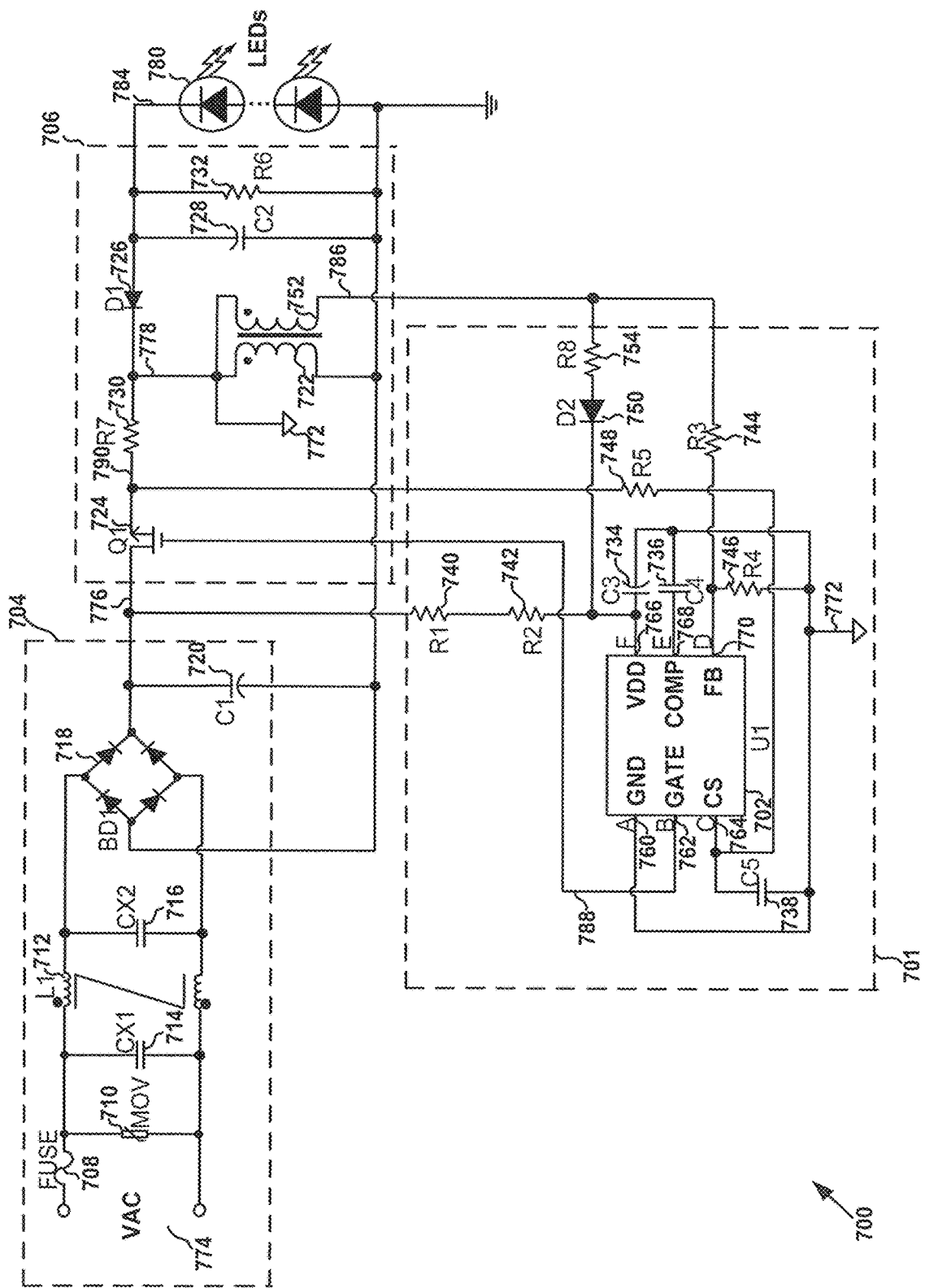
FIG. 7 is a simplified diagram showing a system for driving LEDs according to yet another embodiment of the present invention.

FIG. 7 is a simplified diagram showing a system for driving LEDs according to yet another embodiment of the present invention. This diagram is merely an example, which should not unduly limit the scope of the claims. One of ordinary skill in the art would recognize many variations, alternatives, and modifications.

The system 700 includes a regulation circuit 701, a rectifying-and-filtering circuit 704, and a buck-boost switching circuit 706. The rectifying-and-filtering circuit 704 includes a fuse 708, a varistor 710, a common-mode filtering inductor 712, two X capacitors 714 and 716, a rectifying bridge 718, and a filtering capacitor 720. The buck-boost switching circuit 706 includes a primary winding 722, a secondary winding 752, a switch 724, a fly-back diode 726, a filtering capacitor 728, a current-sensing resistor 730, and an output dummy resistor 732. The regulation circuit 701 includes a system controller 702, three capacitors 734, 736 and 738, six resistors 740, 742, 744, 746, 748 and 754, and a diode 750. The system controller 702 includes six terminals 760, 762, 764, 766, 768 and 770.

For example, a terminal of the resistor 730 and an end of the primary winding 722 are each coupled to a chip ground 772. In another example, the system controller 702 is the same as the system controller 202. In yet another example, the terminals 760, 762, 764, 766, 768 and 770 are the same as the terminals 260, 262, 264, 266, 268 and 270, respectively. In yet another example, loop compensation is carried out internally in the system controller 702, and the terminal 768 (e.g., COMP) is omitted. In yet another example, the switch 724 is a transistor.

According to one embodiment, the primary winding 722 has one terminal coupled to the chip ground 772 and the other terminal coupled to one or more LEDs 780. For example, the secondary winding 752 has one terminal coupled to the chip ground 772, and the other terminal coupled to the terminal 770 (e.g., FB) through a resistor 744. In another example, the resistor 730 (e.g., R7) has one terminal coupled to the chip ground 772, and the other terminal coupled to the switch 724. In yet another example, the diode 726 (e.g., D1) has one terminal (e.g., a cathode terminal) coupled to the chip ground 772, and the other terminal (e.g., an anode terminal) coupled to the one or more LEDs 780. In yet another example, the terminal 764 (e.g., CS) is coupled to the chip ground 772 through the capacitor 738 (e.g., C5), and coupled to both the resistor 730 (e.g., R7) and the switch 724 through the resistor 748 (e.g., R5). In yet another example, the terminal 770 (e.g., FB) is coupled to the chip ground 772 through the resistor 746 (e.g., R4). In yet another example, the terminal 762 (e.g., GATE) is coupled to the switch 724 (e.g., at a gate terminal of the switch 724). In yet another example, the terminal 760 (e.g., GND) is coupled to the chip ground 772. The resistor 748 (e.g., R5) and the capacitor 738 (e.g., C5) are omitted in some embodiments.

According to another embodiment, an AC input 774 is applied to the rectifying-and-filtering circuit 704, which generates an input signal 776. For example, the regulation circuit 701 receives the input signal 776, and outputs a gate drive signal 788 through the terminal 762 (e.g., GATE) to drive the switch 724. In another example, the buck-boost switching circuit 706 receives the input signal 776 for driving one or more LEDs 780. In yet another example, a switching period of the system 700 includes an on-time period, $T_{on}$, during which the switch 724 is closed (e.g., on), and an off-time period, $T_{off}$, during which the switch 724 is open (e.g., off).

According to yet another embodiment, when the switch 724 is closed (e.g., on), a current 778 flows through the resistor 730 and a transformer that includes the primary winding 722 and the secondary winding 752. For example, the transformer that includes the primary winding 722 and the secondary winding 752 stores energy. In another example, a voltage signal 790 is generated by the resistor 730. In yet another example, the voltage signal 790 is proportional in magnitude to the product of the current 778 and the resistance of the resistor 730. In yet another example, the voltage signal 790 is detected at the terminal 764 (e.g., CS) through the resistor 748.

According to yet another embodiment, when the switch 724 is open (e.g., off), the off-time period $T_{off}$ begins, and a demagnetization process of the primary winding 722 starts. For example, at least part of the current 778 flows from the resistor 730 to the one or more LEDs 780 and flows through the diode 726. In another example, the resistor 732 has a large resistance, and a current 784 that flows through the one or more LEDs 780 is close, in magnitude, to the current 778. In yet another example, a voltage signal 786 associated with the secondary winding 752 is detected at the terminal 770 (e.g., FB) through a resistor divider that includes the resistors 744 and 746. In yet another example, the voltage signal 786 is higher than the voltage of the chip ground 772 during the demagnetization process of the primary winding 722. In yet another example, after the demagnetization process of the primary winding 722 is completed, the voltage signal 786 decreases to a low value in magnitude. In yet another example, the system 700 operates with a broad range of inputs and output loads, such as an output load of one or more LEDs (e.g., one LED).

According to yet another embodiment, the peak value of the current 778 in each switching period of the system 700 is kept approximately constant by monitoring the voltage signal 790 at the terminal 764 (e.g., CS). For example, the demagnetization period of the primary winding 722 is detected by monitoring the voltage signal 786 at the terminal 770 (e.g., FB). In another example, a switching period of the system 700 is N times the demagnetization period of the primary winding 722, where N is a ratio larger than 1. Thus, an average magnitude of the current 784 that flows through the one or more LEDs 780 can be determined based on the following equation according to certain embodiments:

$$I_{LED} = \frac{1}{2 \times N} \times \frac{V_{TH\_OC}}{R7} \quad \text{(Equation 6)}$$

where $I_{LED}$ represents the average magnitude of the current 784 that flows through the one or more LEDs 780, N represents the ratio between the switching period of the system 700 and the demagnetization period of the primary winding 722, $V_{TH\_OC}$ represents the peak value of the voltage signal 790, and R7 represents the resistance of the resistor 730. For example, the system controller 702 is the same as the system controller 300, and the system controller 300 is used to replace the system controller 702 as part of the system 700.

According to another embodiment, a system for regulating one or more currents includes a system controller, an inductor, a first resistor, a switch and a first diode. The system controller includes a first controller terminal and a ground terminal, the system controller being configured to output a drive signal at the first controller terminal. The inductor includes a first inductor terminal and a second inductor terminal, the first inductor terminal being coupled to the ground terminal, the second inductor terminal being coupled to one or more light emitting diodes. The first resistor includes a first resistor terminal and a second resistor terminal, the first resistor terminal being coupled to the ground terminal. The switch is configured to receive the drive signal and coupled to the second resistor terminal. Moreover, the first diode includes a first diode terminal and a second diode terminal and coupled to the first resistor, the second diode terminal being coupled to the one or more light emitting diodes. For example, the system is implemented according to at least FIG. 2, FIG. 3(a), FIG. 3(b), FIG. 4(a), FIG. 4(b), and/or FIG. 6.

According to yet another embodiment, a system for regulating one or more currents includes a system controller, a transformer, a first resistor, a switch, and a first diode. The system controller includes a first controller terminal and a ground terminal, the system controller being configured to output a drive signal at the first controller terminal. The transformer includes a primary winding and a secondary winding, the primary winding including a first winding terminal and a second winding terminal, the secondary winding including a third winding terminal and a fourth winding terminal, the first winding terminal being coupled to the ground terminal, the second winding terminal being coupled to one or more light emitting diodes, the third winding terminal being coupled to the ground terminal. The first resistor includes a first resistor terminal and a second resistor terminal, the first resistor terminal being coupled to the ground terminal. The switch is configured to receive the drive signal and coupled to the second resistor terminal. Additionally, the first diode includes a first diode terminal and a second diode terminal and coupled to the first resistor, the second diode terminal being coupled to the one or more light emitting diodes. For example, the system is implemented according to at least FIG. 3(a), FIG. 3(b), FIG. 4(a), FIG. 4(b), FIG. 5 and/or FIG. 7.

According to yet another embodiment, a system for regulating one or more currents includes a system controller that is configured to output a drive signal to a switch and to receive a sensed signal from a resistor connected to the switch and an inductor, the resistor and the inductor being connected directly or indirectly to one or more light emitting diodes. Additionally, the drive signal is associated with one or more switching periods, each of the one or more switching periods including an on-time period for the switch and an off-time period for the switch. Moreover, each of the one or more switching periods is equal to a ratio multiplied by a demagnetization period for a demagnetization process associated with the inductor, the ratio being larger than 1. Furthermore, a first current flowing through the one or more light emitting diodes is proportional to a peak magnitude of the sensed signal within each of the one or more switching periods. For example, the system is implemented according to at least FIG. 2, FIG. 5, FIG. 6, and/or FIG. 7.

According to yet another embodiment, a system for regulating one or more currents includes a modulation-and-drive component, a sample-and-hold component, an amplification component, an error amplifier, and a comparator. The modulation-and-drive component is configured to output a drive signal to a switch, the drive signal being associated with at least one switching period including an on-time period for the switch and a demagnetization period for a demagnetization process. The sample-and-hold component is configured to receive a sensed signal related to a current flowing through the switch, sample the sensed signal at the middle of the on-time period, and hold the sampled sensed signal. The amplification component is configured to receive the held and sampled sensed signal during the demagnetization period and generate an amplified signal. In addition, the error amplifier is configured to receive the amplified signal during the demagnetization period and generate, with at least a first capacitor, an integrated signal. Moreover, the comparator is configured to receive at least the integrated signal and output a comparison signal to the modulation-and-drive component based on at least information associated with the integrated signal. For example, the system is implemented according to at least FIG. 2, FIG. 3(a), FIG. 3(b), FIG. 5, FIG. 6, and/or FIG. 7.

In another embodiment, a system for regulating one or more currents includes a modulation-and-drive component, a signal-holding component, an amplification component, an error amplifier, and a comparator. The modulation-and-drive component is configured to output a drive signal to a switch, the drive signal being associated with at least one switching period including an on-time period for the switch and a demagnetization period for a demagnetization process. The amplification component is configured to, during the demagnetization period, receive a sensed signal related to a first current flowing through the switch and generate an amplified signal. Additionally, the error amplifier is configured to receive the amplified signal during the demagnetization period and generate, with at least a first capacitor, an integrated signal. Moreover, the comparator is configured to receive at least the integrated signal and output a comparison signal to the modulation-and-drive component based on at least information associated with the integrated signal. For example, the system is implemented according to at least FIG. 2, FIG. 4(a), FIG. 4(b), and/or FIG. 5.

In yet another embodiment, a method for regulating one or more currents includes receiving a sensed signal from a resistor connected to a switch and an inductor, and processing information associated with the sensed signal. In addition, the method includes generating a drive signal for the switch based on at least information associated with the sensed signal, processing information associated with the drive signal, and generating a current flowing through one or more light emitting diodes based on at least information associated with the drive signal, the one or more light emitting diodes being connected directly or indirectly to the resistor and the inductor. Further, the drive signal is associated with one or more switching periods, each of the one or more switching periods including an on-time period for the switch and an off-time period for the switch. Each of the one or more switching periods is equal to a ratio multiplied by a demagnetization period for a demagnetization process associated with the inductor, the ratio being larger than 1. Moreover, the current is proportional to a peak magnitude of the sensed signal within each of the one or more switching periods. For example, the method is implemented according to at least FIG. 2, FIG. 5, FIG. 6, and/or FIG. 7.

In yet another embodiment, a method for regulating one or more currents includes generating a drive signal for a switch, the drive signal being associated with at least one switching period including an on-time period for the switch and a demagnetization period for a demagnetization process. The method further includes receiving a sensed signal related to a current flowing through the switch, processing information associated with the sensed signal, and sampling the sensed signal at the middle of the on-time period. In addition, the method includes holding the sampled sensed signal, receiving the held and sampled sensed signal during the demagnetization period, and processing information associated with the received held and sampled sensed signal. The method also includes generating an amplified signal based on at least information associated with the received held and sampled sensed signal, receiving the amplified signal, and processing information associated with the amplified signal. Furthermore, the method includes generating an integrated signal based on at least information associated with the amplified signal, receiving at least the integrated signal, processing information associated with the integrated signal, and generating a comparison signal based on at least information associated with the integrated signal. For example, the method is implemented according to at least FIG. 2, FIG. 3(a), FIG. 3(b), FIG. 5, FIG. 6 and/or FIG. 7.

In yet another embodiment, a method for regulating one or more currents includes generating a drive signal for a switch, the drive signal being associated with at least one switching period including an on-time period for the switch and a demagnetization period for a demagnetization process.

Additionally, the method includes receiving a sensed signal related to a current flowing through the switch during the demagnetization period, processing information associated with the received sensed signal, and generating an amplified signal based on information associated with the received sensed signal. The method also includes receiving the amplified signal, processing information associated with the amplified signal, and generating an integrated signal based on at least information associated with the amplified signal. Moreover, the method includes receiving at least the integrated signal, processing information associated with the integrated signal, generating a comparison signal based on at least information associated with the integrated signal, and receiving the comparison signal. For example, the method is implemented according to at least FIG. 2, FIG. 4(a), FIG. 4(b), and/or FIG. 5.

For example, some or all components of various embodiments of the present invention each are, individually and/or in combination with at least another component, implemented using one or more software components, one or more hardware components, and/or one or more combinations of software and hardware components. In another example, some or all components of various embodiments of the present invention each are, individually and/or in combination with at least another component, implemented in one or more circuits, such as one or more analog circuits and/or one or more digital circuits. In yet another example, various embodiments and/or examples of the present invention can be combined.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A system for regulating one or more currents, the system comprising:
    a system controller including a first controller terminal, a second controller terminal, and a ground terminal, the system controller being configured to output a drive signal at the first controller terminal;
    a transformer including a primary winding and a secondary winding, the primary winding including a first winding terminal and a second winding terminal, the secondary winding including a third winding terminal and a fourth winding terminal, the first winding terminal being coupled to the ground terminal, the second winding terminal being coupled to one or more light emitting diodes, the third winding terminal being coupled to the ground terminal; and
    a first diode including a first diode terminal and a second diode terminal the second diode terminal being coupled to the one or more light emitting diodes;
    wherein:
        the transformer is configured to output a first voltage signal at the fourth winding terminal;
        the system controller is further configured to receive a second voltage signal at the second controller terminal; and
        the second voltage signal is associated with the first voltage signal.

2. The system of claim 1, further comprising:
    a resistor including a first resistor terminal and a second resistor terminal;
    wherein the second resistor terminal is coupled to the first diode terminal.

3. The system of claim 1, further comprising:
    a resistor including a first resistor terminal and a second resistor terminal;
    wherein:
        the first resistor terminal is coupled to the first diode terminal; and
        the first diode terminal is coupled to the ground terminal.

4. The system of claim 1, wherein the second voltage signal is proportional to the first voltage signal.

5. A system for regulating one or more currents, the system comprising:
    a modulation-and-drive component configured to output a drive signal to a switch, the drive signal being associated with at least one switching period including an on-time period for the switch and a demagnetization period for a demagnetization process; and
    a sample-and-hold component configured to receive a sensed signal related to a first current flowing through the switch, sample the sensed signal at the middle of the on-time period, and hold the sampled sensed signal;
    wherein the sample-and-hold component includes a timing component and a capacitor;
    wherein:
        the timing component is configured to generate a timing signal;
        the capacitor is configured to, in response to the timing signal, receive the sensed signal during a predetermined period of time and hold the sensed signal sampled at the end of the predetermined period of time; and
        the predetermined period of time starts at the beginning of the on-time period and ends at the middle of the on-time period.

6. The system of claim 5, further comprising:
    an amplification component configured to receive the held and sampled sensed signal during the demagnetization period and generate an amplified signal;
    an error amplifier configured to receive the amplified signal during the demagnetization period and generate an integrated signal; and
    a comparator configured to receive at least the integrated signal and output a comparison signal to the modulation-and-drive component based on at least information associated with the integrated signal.

7. The system of claim 6 wherein:
    the modulation-and-drive component includes a modulation component and a gate driver;
    wherein:
        the modulation component is configured to receive at least the comparison signal and generate a modulation signal based on at least information associated with the comparison signal, the modulation signal being at a first logic level during the on-time period and at a second logic level during at least the demagnetization period; and
        the gate driver is configured to receive at least the modulation signal and generate the drive signal based on at least information associated with the modulation signal.

8. The system of claim 6 wherein the error amplifier is further configured to receive a reference signal and generate the integrated signal based on at least information associated with the reference signal and the amplified signal.

9. The system of claim 6 wherein an average magnitude of a second current flowing through one or more light emitting diodes is proportional to a ratio between a magnitude of the reference signal and an amplification factor associated with the amplification component, the second current being related to the sensed signal.

10. The system of claim 5 wherein the modulation component includes a flip-flop component.

11. A system for regulating one or more currents, the system comprising:
 a modulation-and-drive component configured to output a drive signal to a switch, the drive signal being associated with at least one switching period including an on-time period for the switch and a demagnetization period for a demagnetization process;
 an error amplifier configured to receive an amplified signal associated with the switch during the demagnetization period and generate an integrated signal; and
 a comparator configured to receive at least the integrated signal and output a comparison signal to the modulation-and-drive component based on at least information associated with the integrated signal;
 wherein the error amplifier is further configured to receive a reference signal and generate the integrated signal based on at least information associated with the reference signal and the amplified signal; and
 wherein an average magnitude of a second current flowing through one or more light emitting diodes is proportional to a ratio between a magnitude of the reference signal and an amplification factor associated with the amplification component, the second current being related to a sensed signal related to a first current.

12. The system of claim 11, further comprising:
 an amplification component configured to, during the demagnetization period, receive a sensed signal flowing through the switch and generate the amplified signal.

13. The system of claim 11 wherein:
 the modulation-and-drive component includes a modulation component and a gate driver;
 wherein:
  the modulation component is configured to receive at least the comparison signal and generate a modulation signal based on at least information associated with the comparison signal, the modulation signal being at a first logic level during the on-time period and at a second logic level during at least the demagnetization period; and
  the gate driver is configured to receive at least the modulation signal and generate the drive signal based on at least information associated with the modulation signal.

14. A method for regulating one or more currents, the method comprising:
 generating a drive signal for a switch, the drive signal being associated with at least one switching period including an on-time period for the switch and a demagnetization period for a demagnetization process;
 receiving a sensed signal related to a first current flowing through the switch;
 sampling the sensed signal at the middle of the on-time period;
 generating, by an amplification component, an amplified signal based on at least information associated with the received held and sampled sensed signal;
 receiving the amplified signal and a reference signal;
 generating an integrated signal based on at least information associated with the amplified signal and the reference signal;
 receiving at least the integrated signal; and
 generating a comparison signal based on at least information associated with the integrated signal;
 wherein an average magnitude of a second current flowing through one or more light emitting diodes is proportional to a ratio between a magnitude of the reference signal and an amplification factor associated with the amplification component, the second current being related to the received sensed signal.

* * * * *